June 7, 1938.　　　　H. W. GREGOIRE　　　　2,120,214
PAPER BOX MAKING APPARATUS AND METHOD
Filed Jan. 14, 1937　　　　18 Sheets-Sheet 1
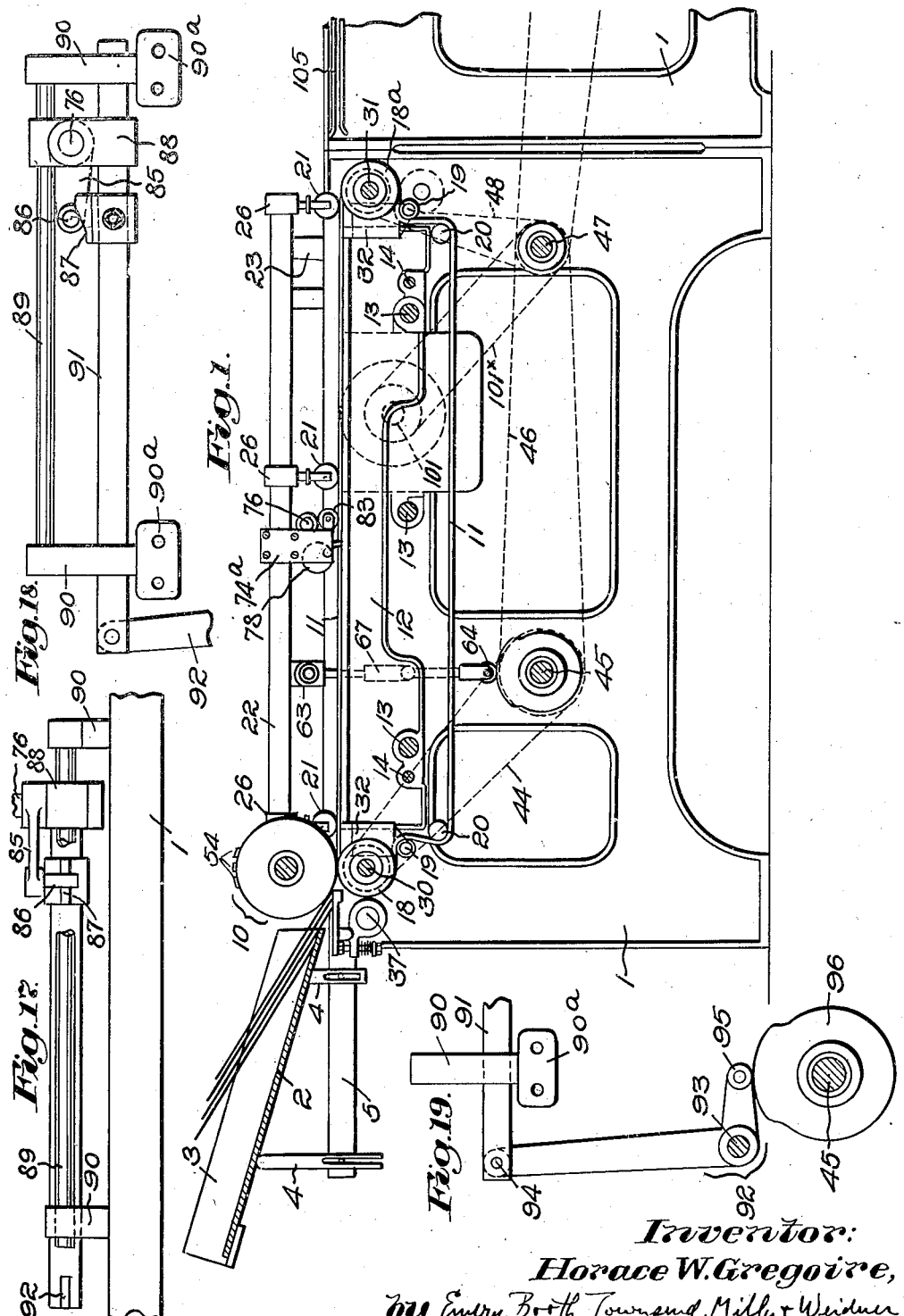
Inventor:
Horace W. Gregoire,
by Emery, Booth, Townsend, Miller & Weidner
Attys.

June 7, 1938.  H. W. GREGOIRE  2,120,214
PAPER BOX MAKING APPARATUS AND METHOD
Filed Jan. 14, 1937  18 Sheets-Sheet 2
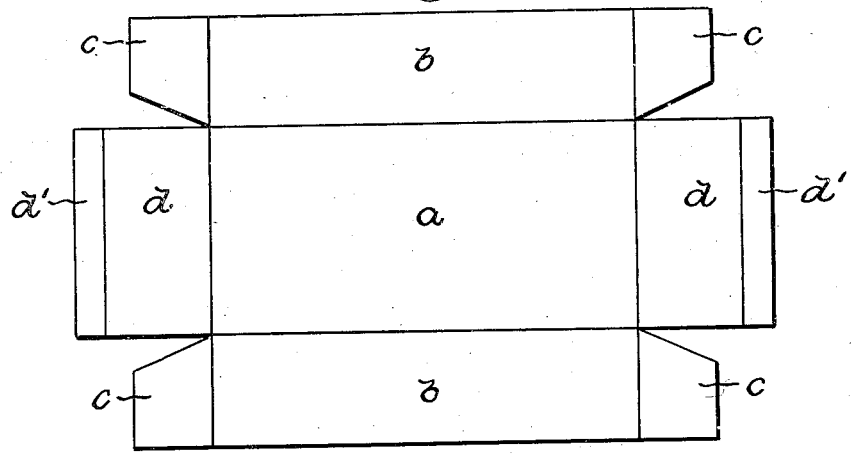
Fig. 1ª
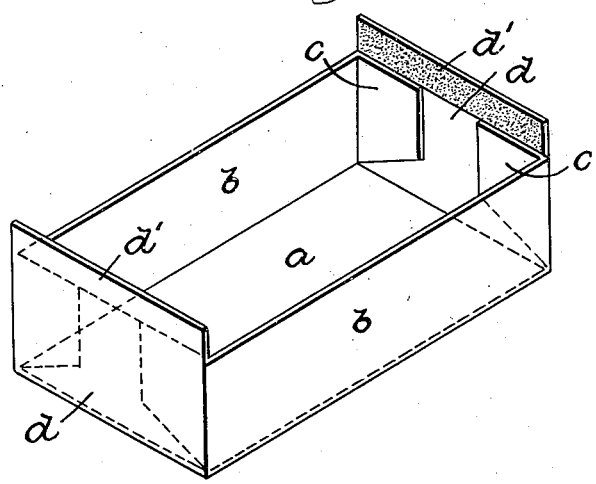
Fig. 1ᵇ
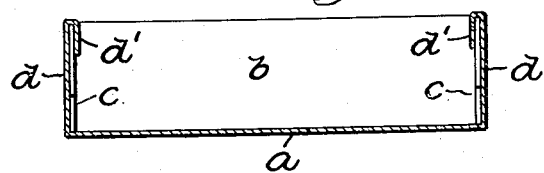
Fig. 1ᶜ
Inventor:
Horace W. Gregoire,
by Emery, Booth, Townsend, Miller & Neidner
Attys

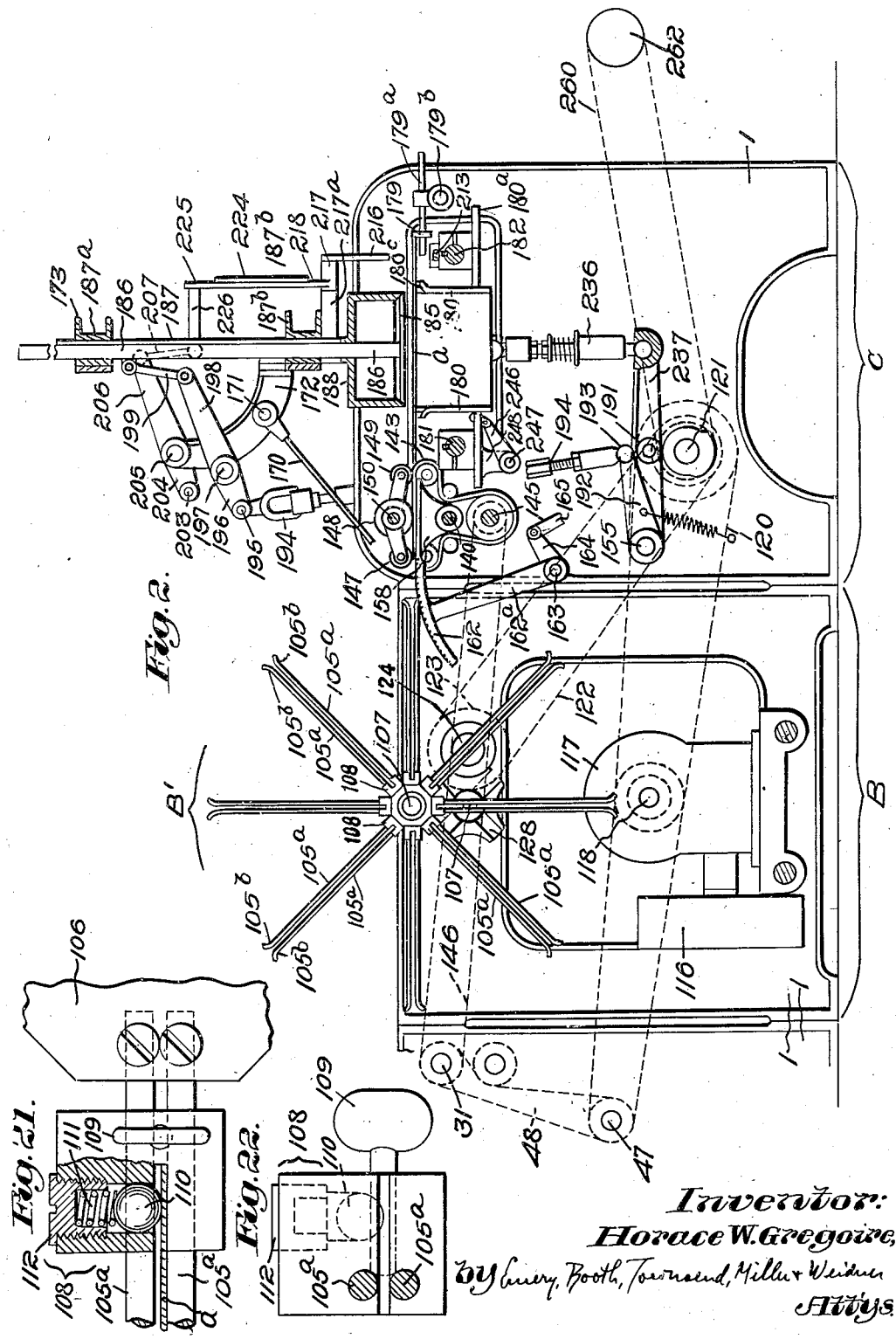

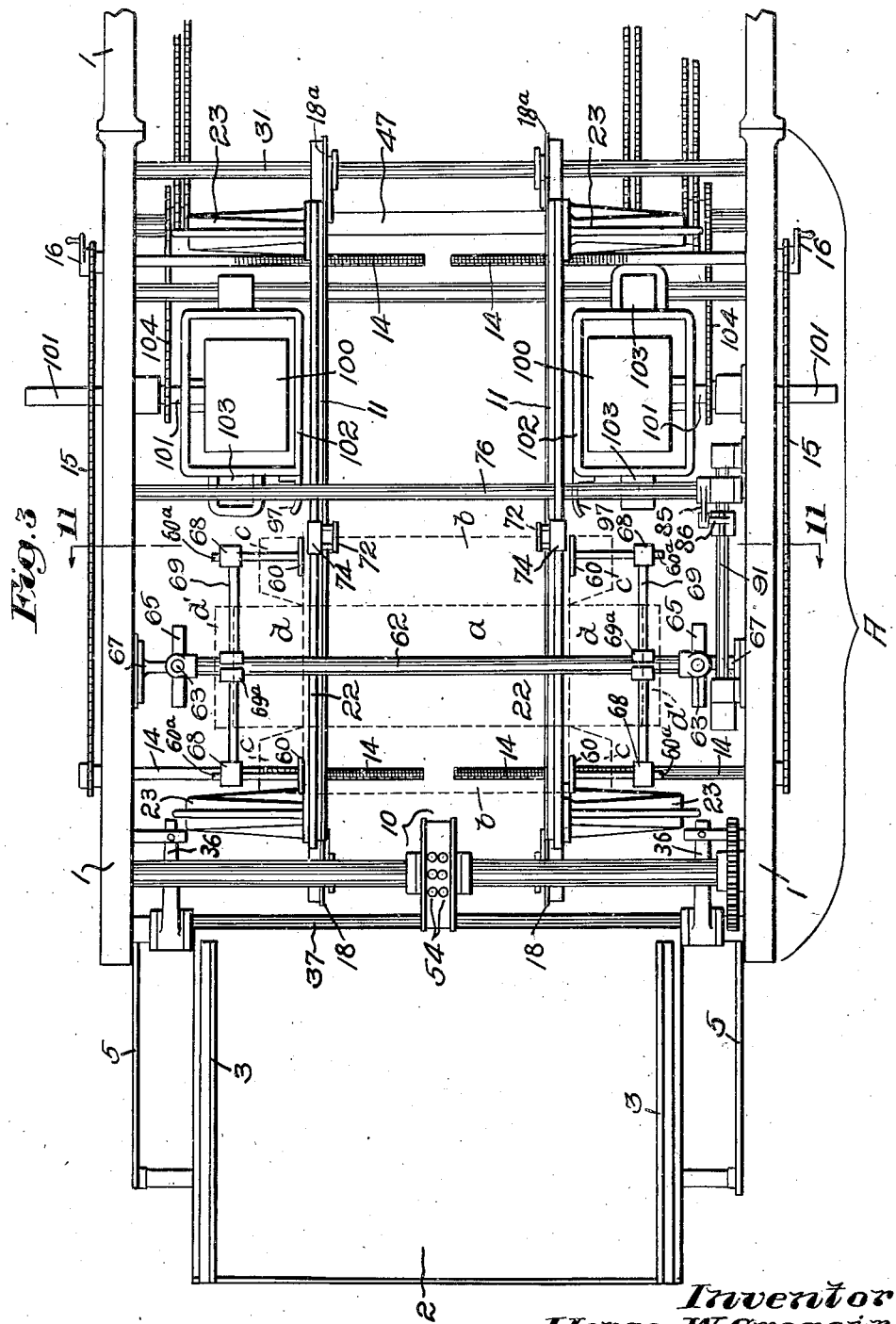

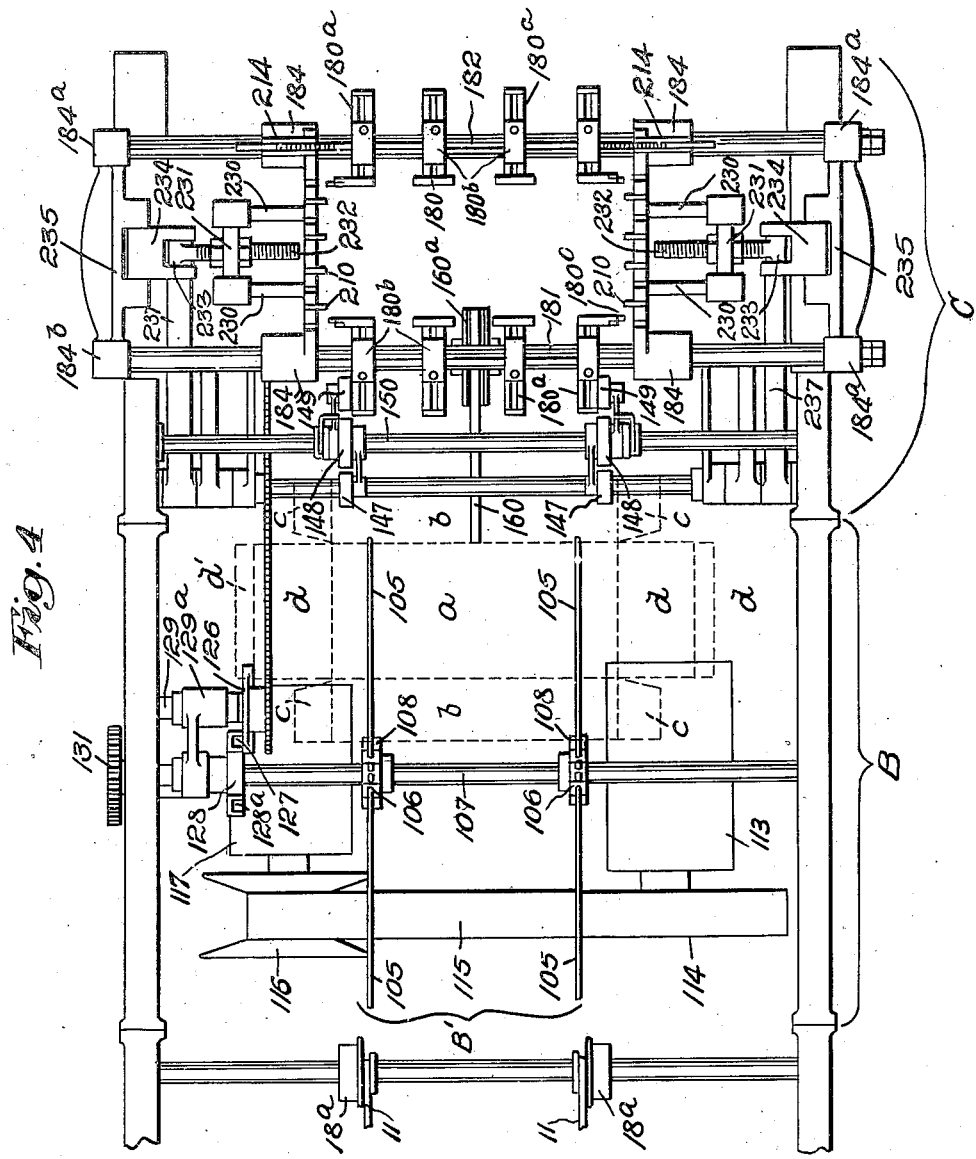

June 7, 1938.  H. W. GREGOIRE  2,120,214
PAPER BOX MAKING APPARATUS AND METHOD
Filed Jan. 14, 1937   18 Sheets-Sheet 6
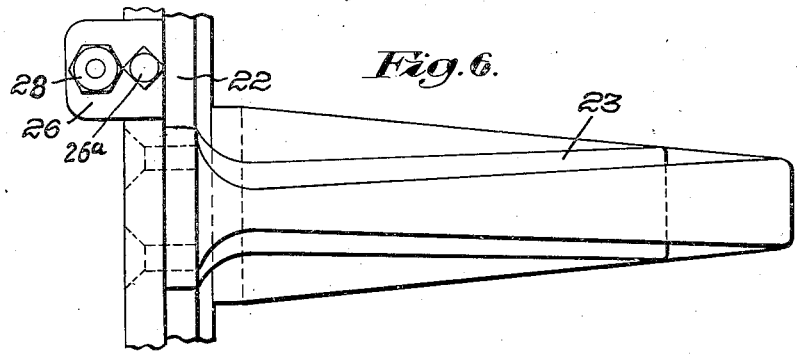
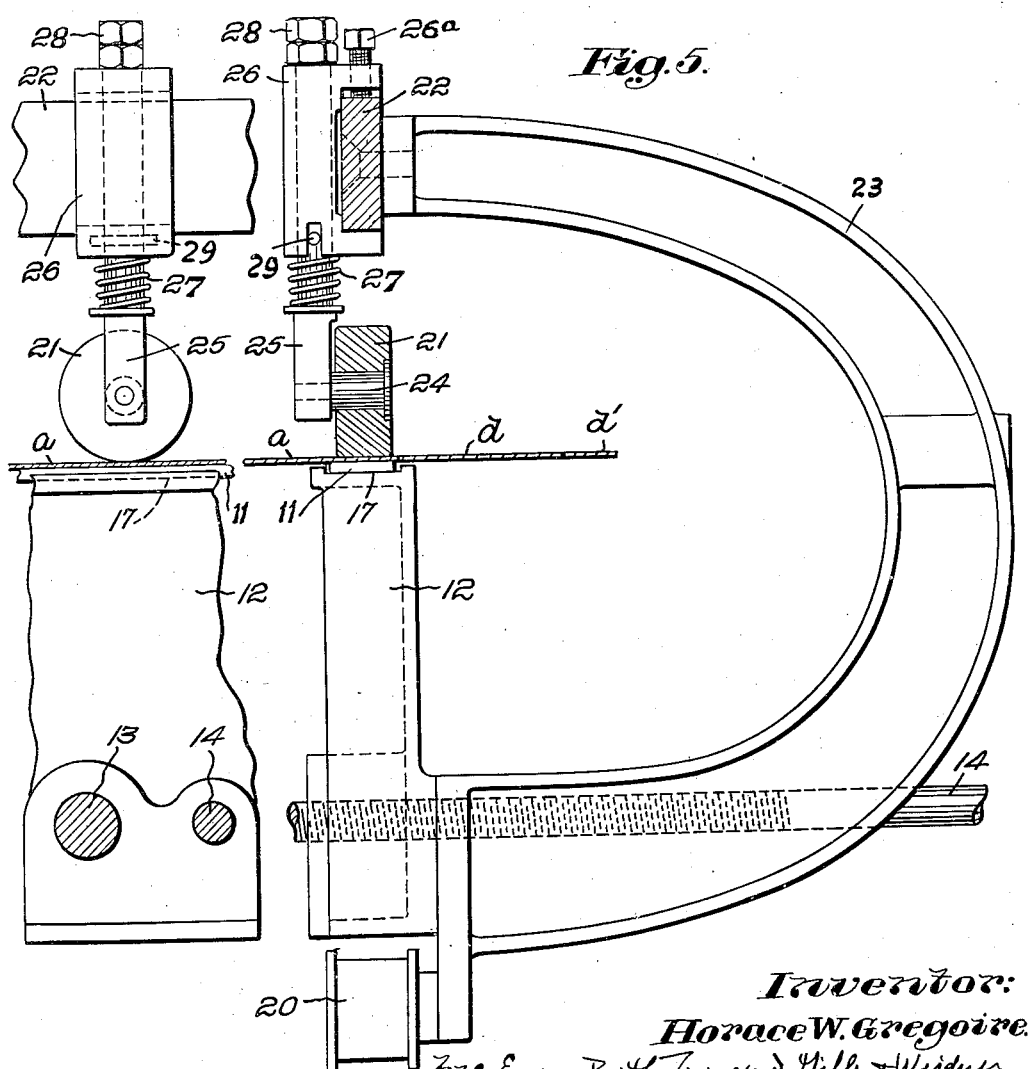
Inventor:
Horace W. Gregoire.
by Emery, Booth, Townsend, Miller & Weidner
Attys.

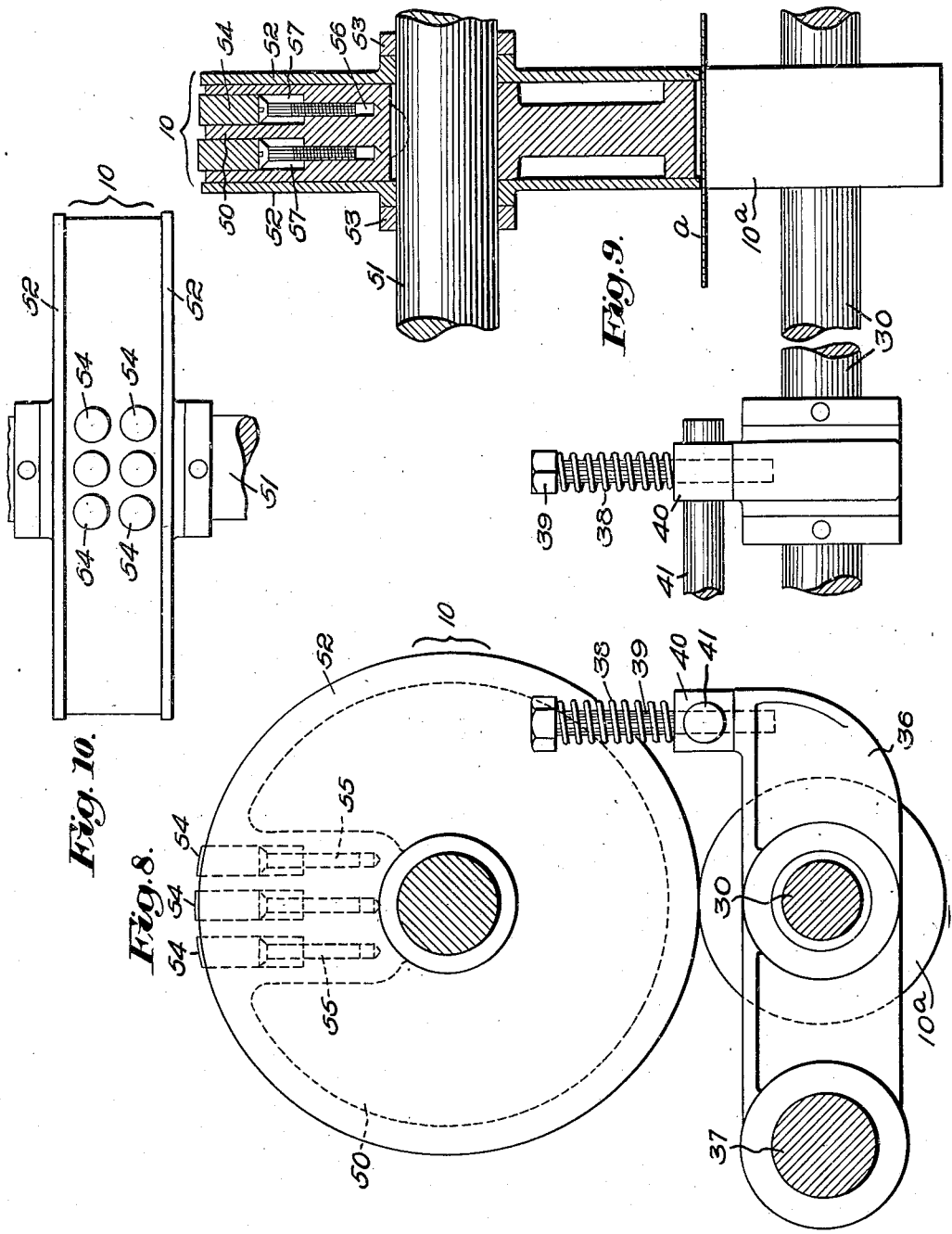

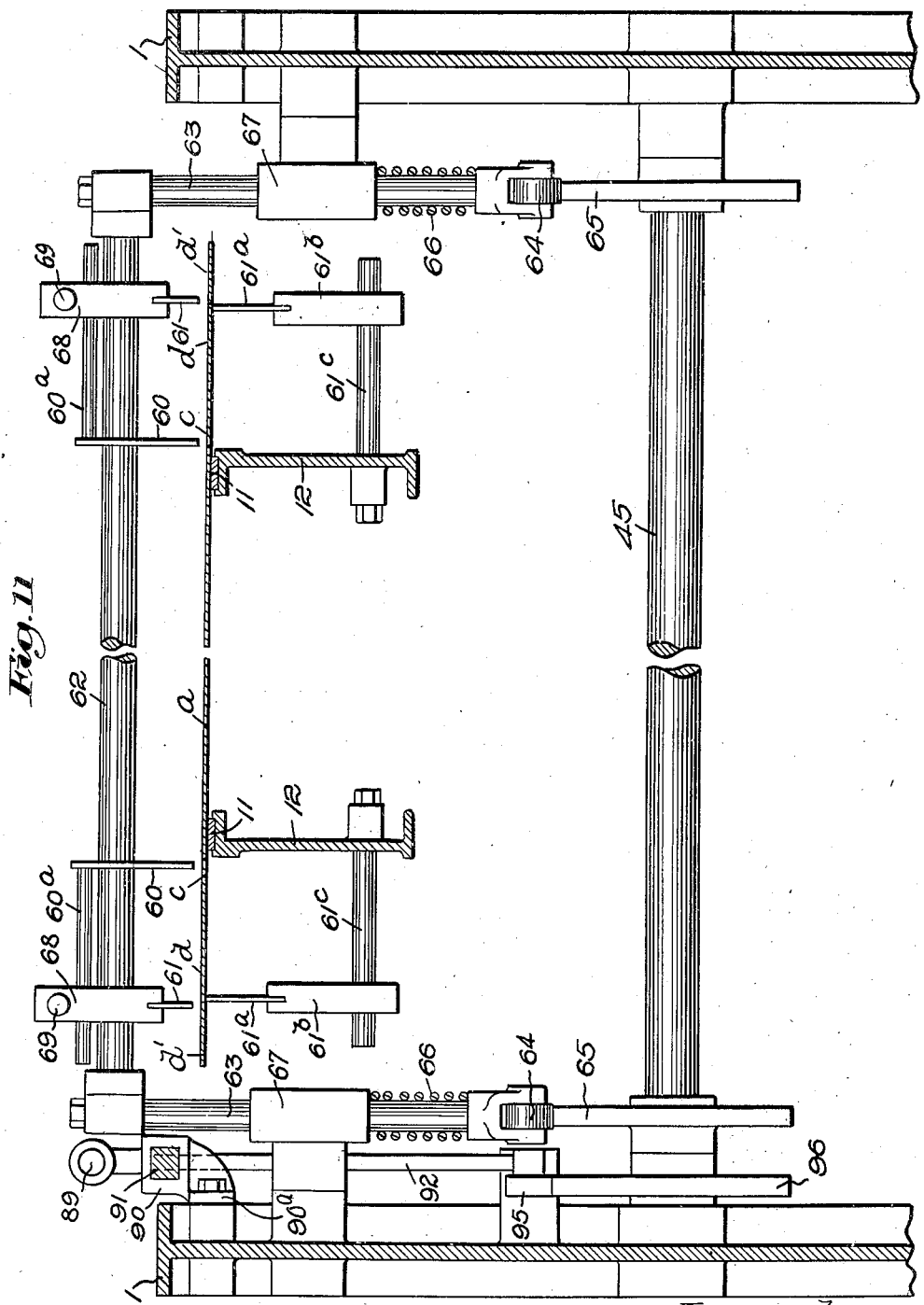

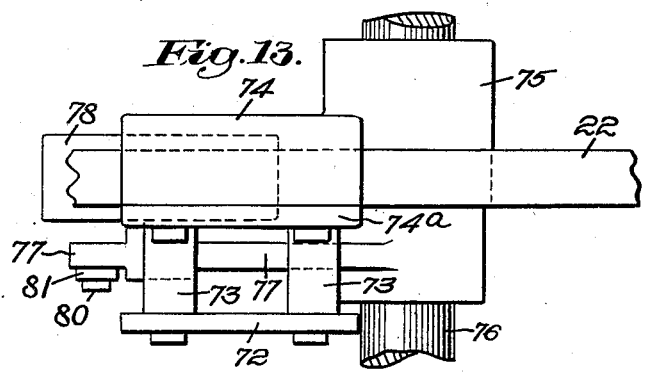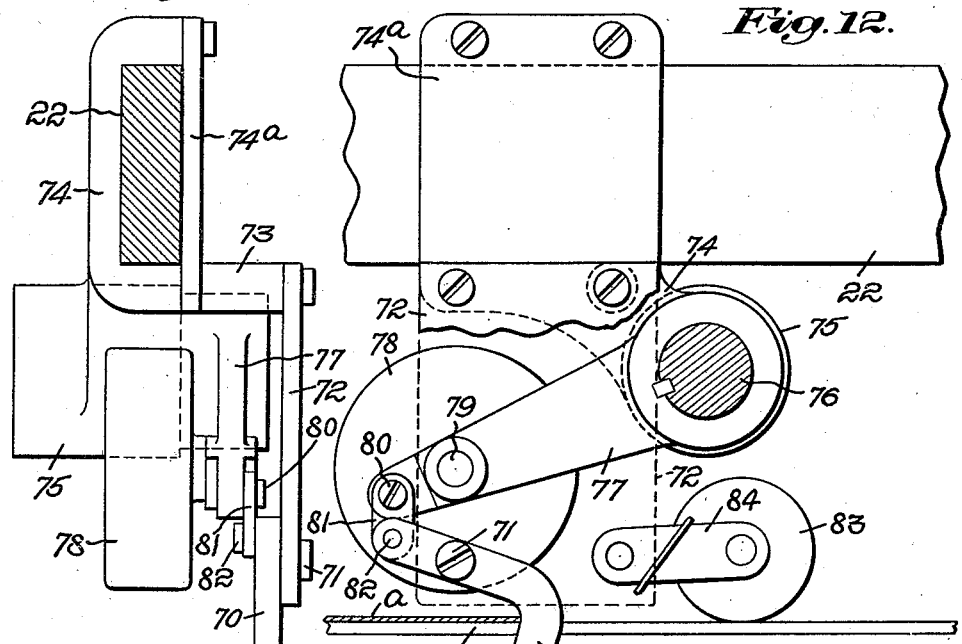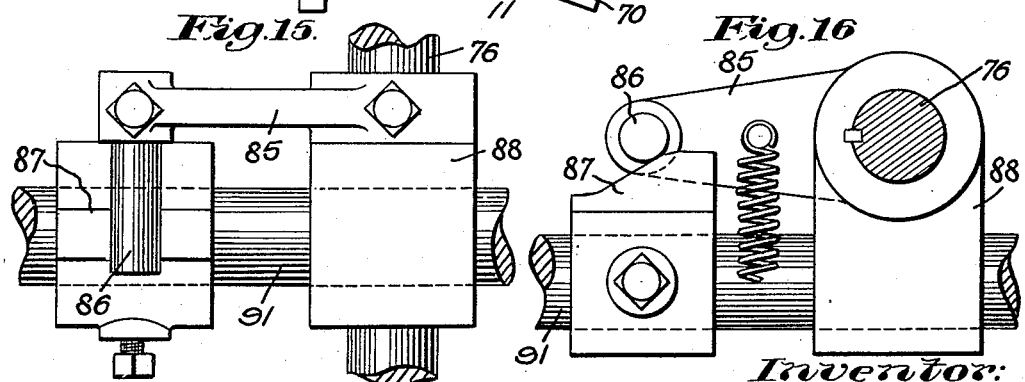

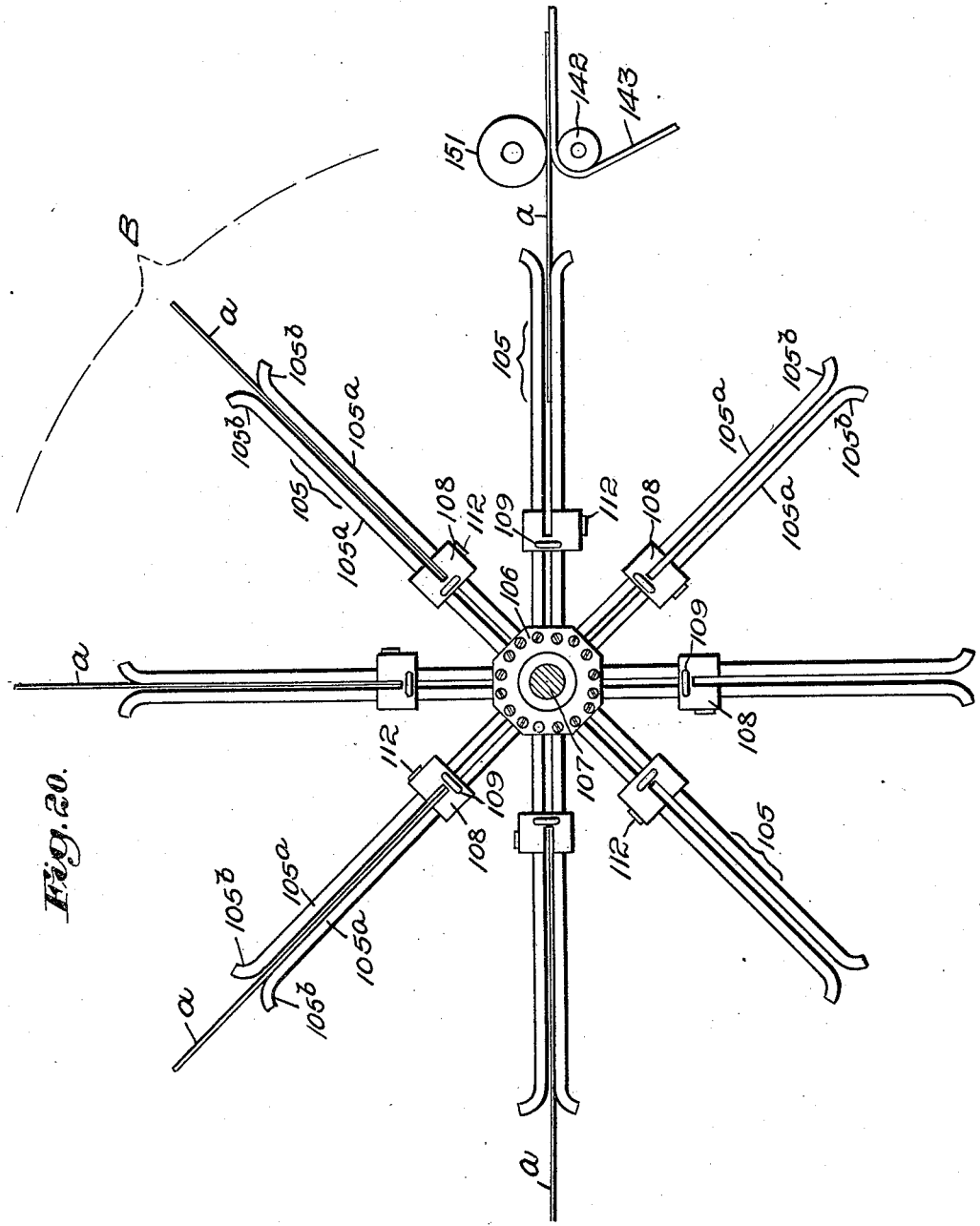

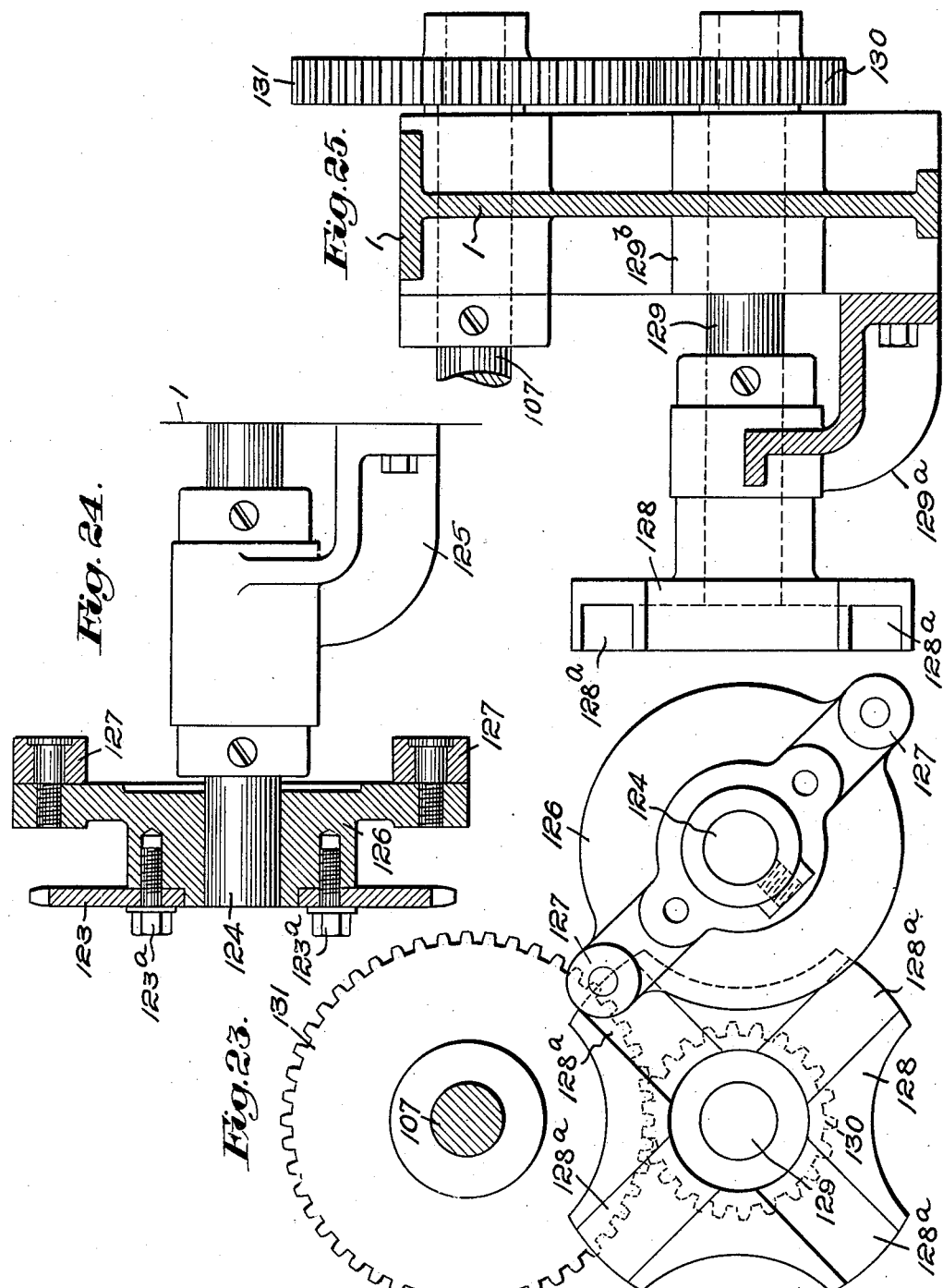

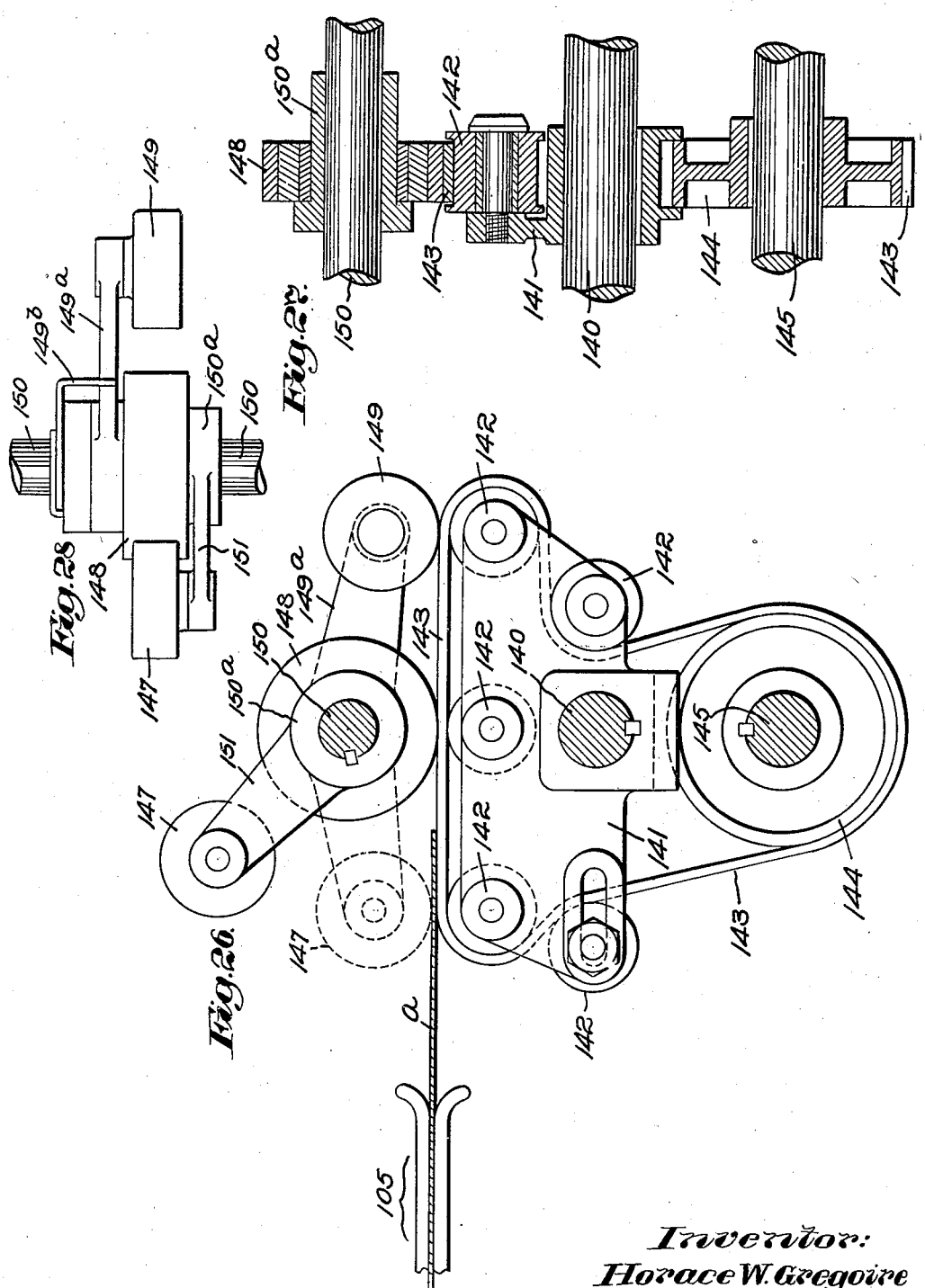

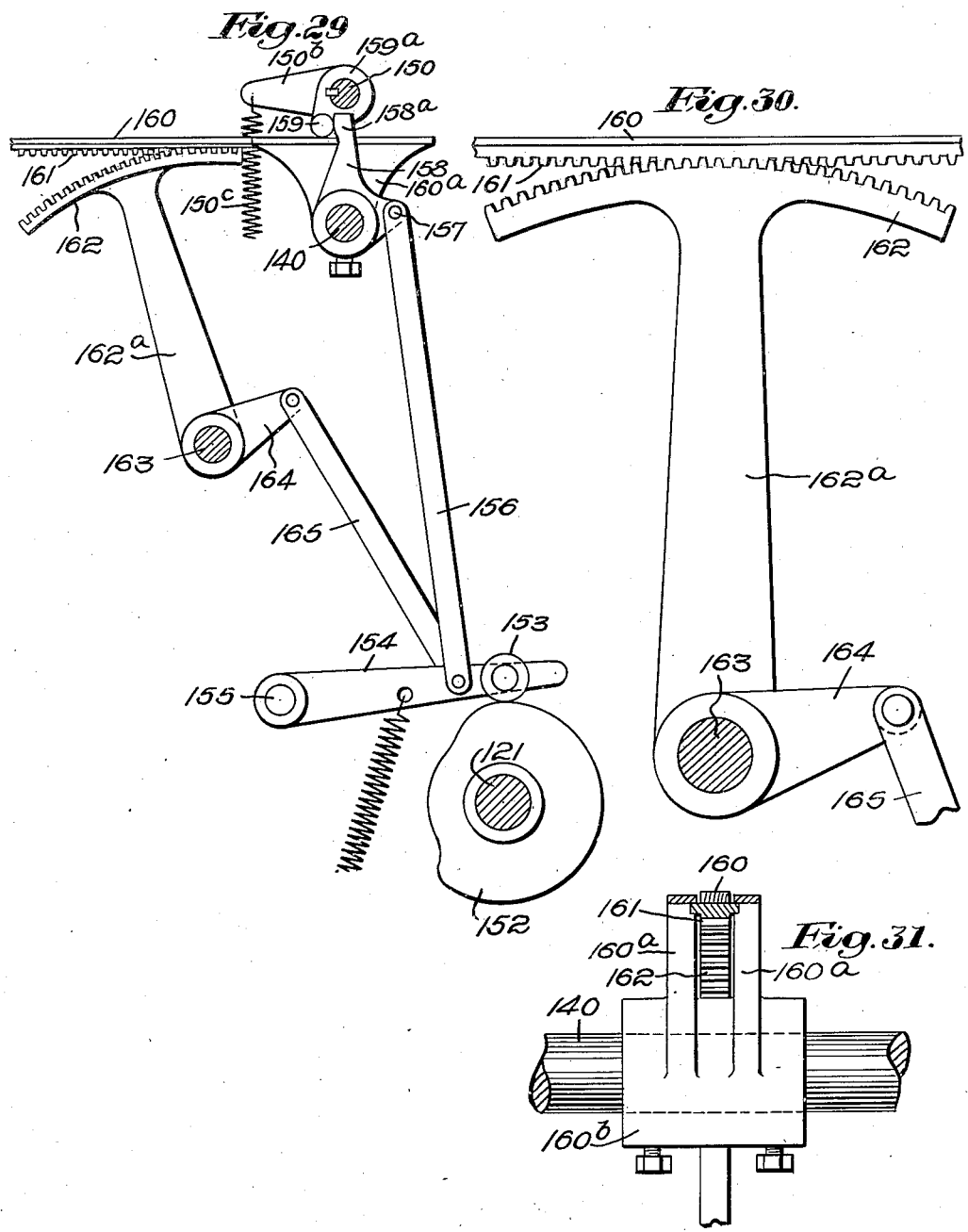

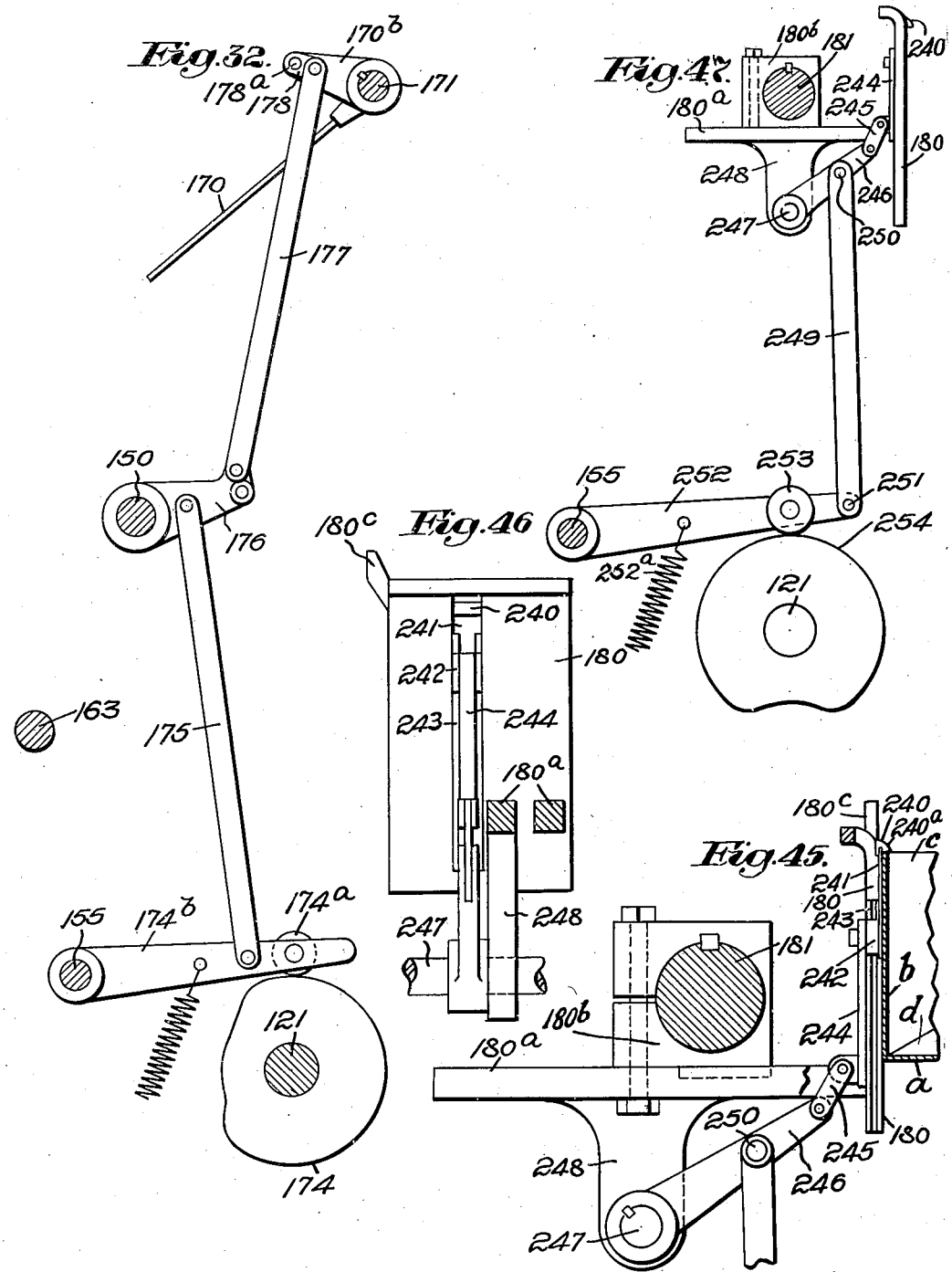

June 7, 1938. H. W. GREGOIRE 2,120,214
PAPER BOX MAKING APPARATUS AND METHOD
Filed Jan. 14, 1937 18 Sheets-Sheet 15
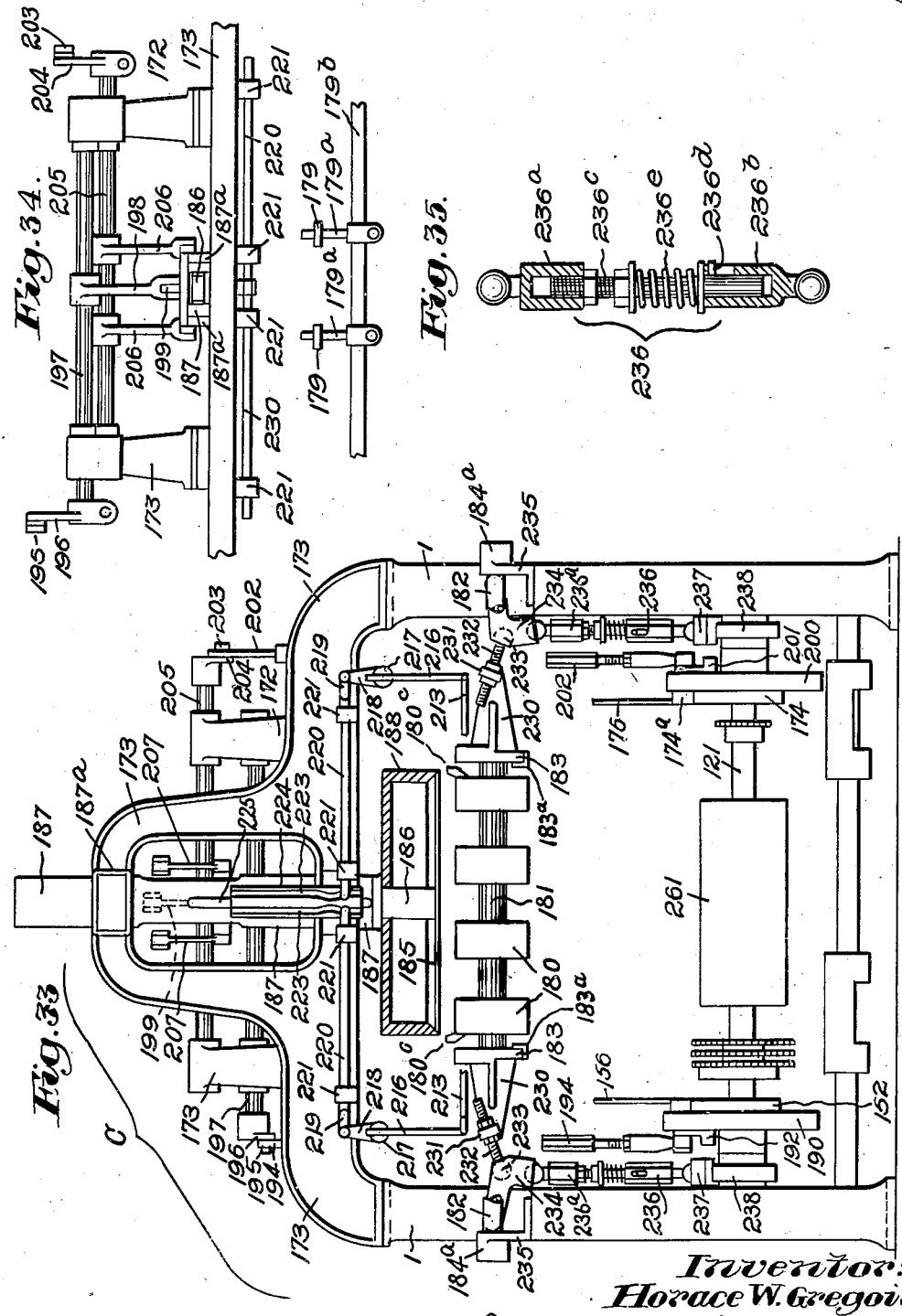
Inventor:
Horace W. Gregoire
by Emery, Booth, Townsend, Miller & Weidner
Attys

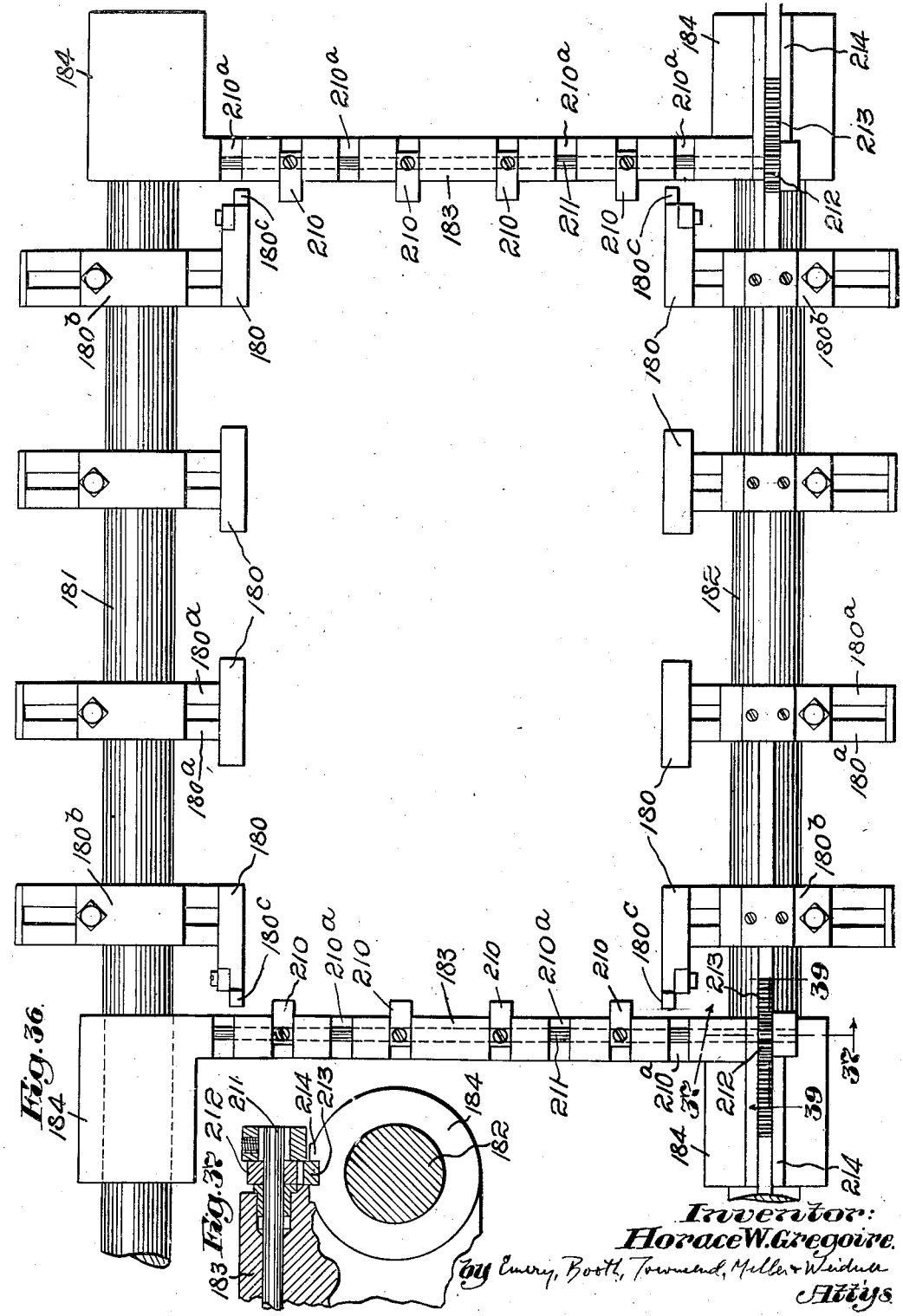

June 7, 1938. H. W. GREGOIRE 2,120,214
PAPER BOX MAKING APPARATUS AND METHOD
Filed Jan. 14, 1937 18 Sheets-Sheet 17
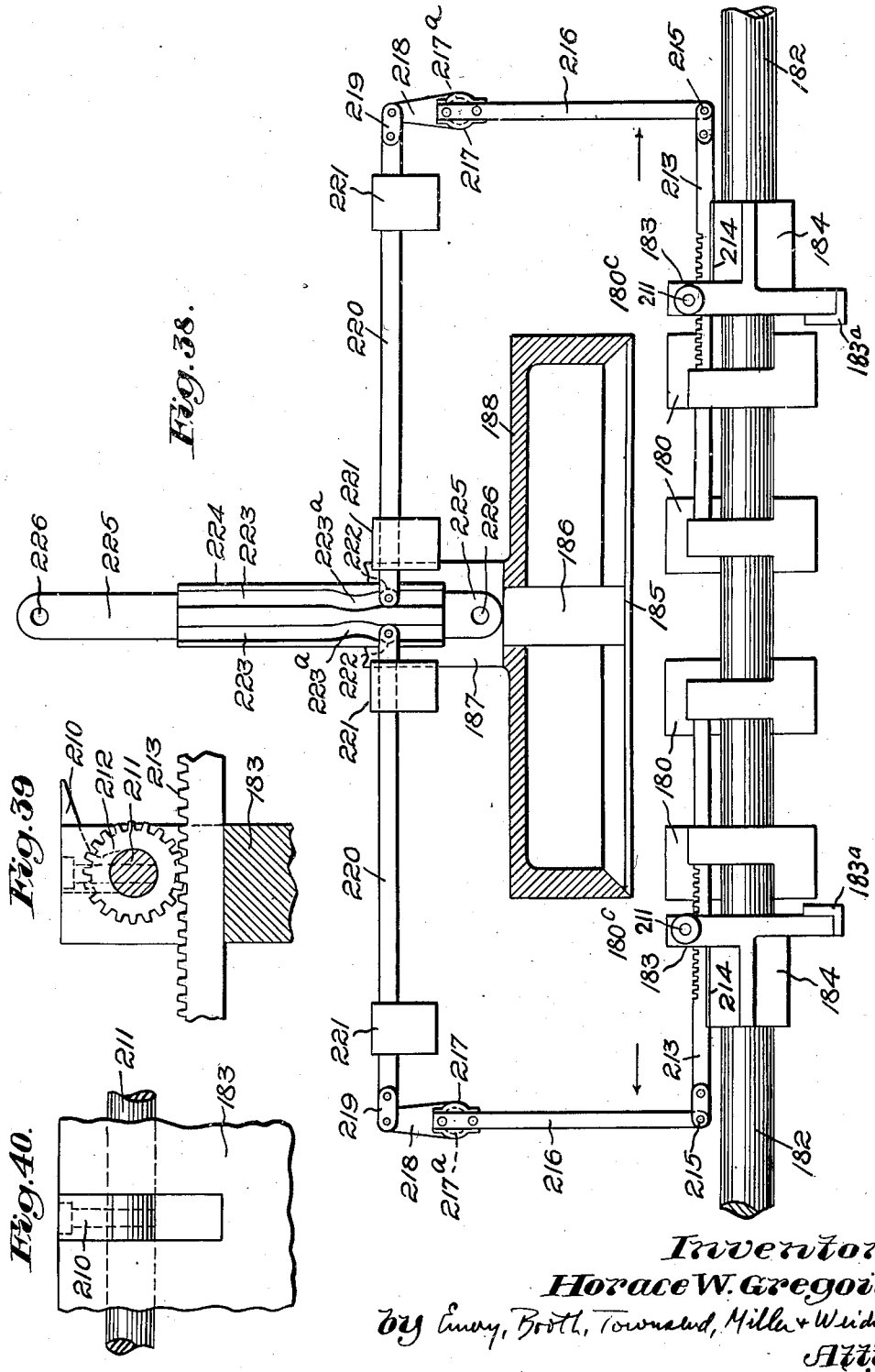
Inventor:
Horace W. Gregoire,
by Emery, Booth, Townsend, Miller & Weidner
Attys.

June 7, 1938.   H. W. GREGOIRE   2,120,214
PAPER BOX MAKING APPARATUS AND METHOD
Filed Jan. 14, 1937   18 Sheets-Sheet 18
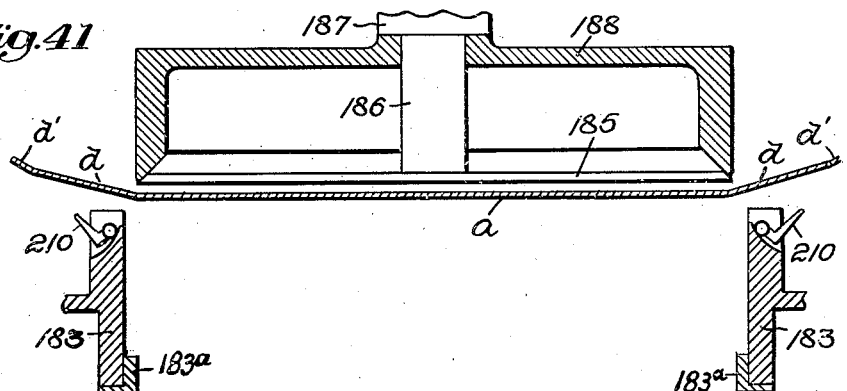
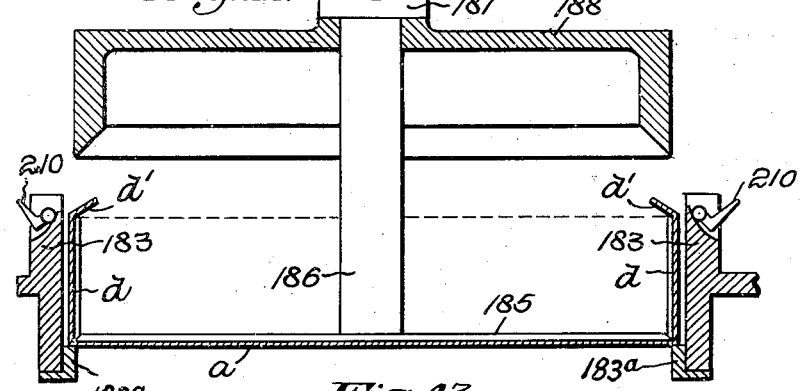
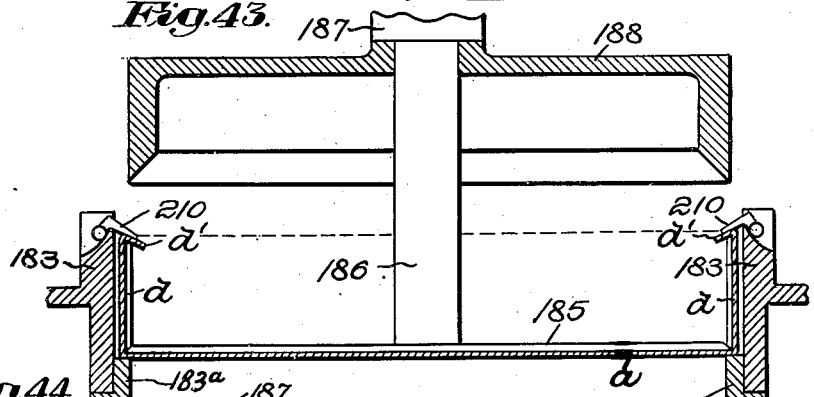
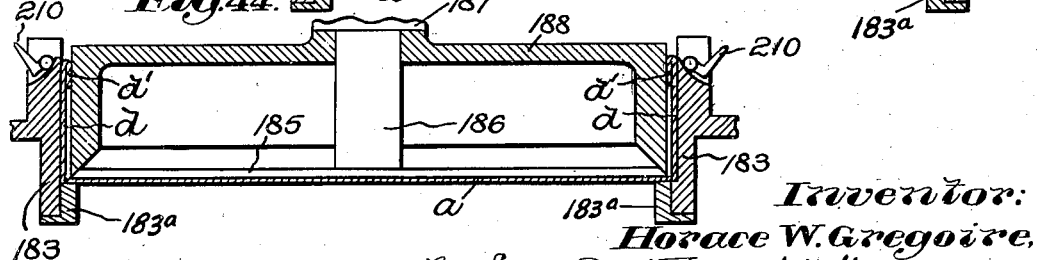
Inventor:
Horace W. Gregoire,
by Emery, Booth, Townsend, Miller & Widner
Attys.

Patented June 7, 1938

2,120,214

UNITED STATES PATENT OFFICE 2,120,214

PAPER BOX MAKING APPARATUS AND METHOD

Horace W. Gregoire, Newtonville, Mass., assignor to Oskar W. Wikstrom, Newton, Mass.

Application January 14, 1937, Serial No. 120,515

38 Claims. (Cl. 93—51)

The present invention relates to the manufacture of paper boxes, particularly those of the set-up or tray form, usually having one open face, generally the top, and having either separate tray-form or other covers or integral hinged or one-piece covers, and including especially boxes of the turned-over-end type as shown, for example, in U. S. Patent 1,281,982 which latter illustrates a machine of the general class with which the invention here is concerned and upon which it is an improvement. The invention aims to provide improved apparatus and methods applicable to the making of such boxes and also applicable, as to certain of its broad aspects, to the manufacture of adhesively-secured paper boxes in general, with particular reference to the production of strong, well-secured articles, also to the ready adaptability of the apparatus to different box sizes, and to the general efficiency of the mechanism and the operations involved.

In the drawings illustrating by way of example one form of apparatus embodying the invention and by means of which the method thereof may be practiced, Fig. 1 is a longitudinal section of the initial unit I or section of the apparatus, to be referred to as the breaking and gluing unit A;

Figs. 1ª, 1ᵇ and 1ᶜ illustrate respectively a typical blank, a partially formed box, and a longitudinal part section of a formed box;

Fig. 2 is a longitudinal section, being substantially an extension of Fig. 1, showing the transferring, conditioning and indexing section or intermediate unit B and the final or forming end, delivery section or unit C;

Fig. 3 is a plan of the initial unit A, corresponding to Fig. 1;

Fig. 4 is a plan of the intermediate and final units B and C, corresponding to Fig. 2;

Figs. 5, 6 and 7, on a larger scale, respectively are an end elevation of a feed belt carrier and roll bracket, a plan of the same and a partial side elevation looking from the left in Fig. 5;

Figs. 8, 9 and 10 are respectively a side elevation, a vertical section and a plan of a portion of the feed mechanism, with parts in elevation;

Fig. 11 is a cross section substantially on the line 11—11 of Fig. 3, showing the breaker mechanism, for initially flexing or bending certain portions of the blanks;

Figs. 12, 13 and 14 are a side elevation, a plan and an end view of a device for halting the individual blanks while the breakers are acting on them;

Figs. 15 and 16 are a plan and a side elevation of cam mechanism for operating said halting means of Figs. 12 to 14;

Figs. 17, 18 and 19, on Sheet 1, are respectively a plan and a side elevation of further operating mechanism associated with the cam means of Figs. 15 and 16, and an elevation of the operating cam for the parts shown in Figs. 17 and 18;

Fig. 20 shows in elevation, upon a larger scale, the main element or index wheel of the transferring, conditioning and indexing or intermediate unit B;

Figs. 21 and 22, on Sheet 2, are detail views of a means for positioning and holding the blanks during their passage through the intermediate unit B of Figs. 2, 4 and 20;

Fig. 23 is an elevation of a drive mechanism for the intermediate unit B;

Fig. 24 is a view partly in section of the driving element of the mechanism of Fig. 23;

Fig. 25 shows the gearing of Fig. 23 as viewed from the right in said figure, with the drive element of Fig. 24 omitted;

Figs. 26, 27 and 28 are respectively a side elevation, a vertical section and a plan of an accelerating feed mechanism for taking the blanks from the intermediate unit and presenting them to the forming throat;

Fig. 29 is a skeletonized view of operating mechanism associated with the accelerating feed and with a movable blank support;

Fig. 30 is an enlarged elevation of the main parts of said blank support;

Fig. 31 is an enlarged cross section of a portion of said blank support;

Fig. 32 illustrates certain justifying means for the blank and the operating mechanism therefor;

Fig. 33 is an end elevation, with parts omitted and others in vertical section, of the forming and delivery end of the apparatus, unit C;

Fig. 34 is a partial plan of the mechanism of Fig. 33;

Fig. 35 is a vertical section on an enlarged scale of a drive connection for certain of the pressure applying elements of the forming throat;

Fig. 36 is a large-scale plan of the forming throat, including the tucker mechanism for the end flaps;

Fig. 37 is an enlarged section as upon the line 37—37, Fig. 36;

Fig. 38 is an enlarged skeletonized view of the operating means for the tucker mechanism of Fig. 36;

Fig. 39 is a section as upon the line 39—39, Fig. 36;

Fig. 40 shows one of the tucker elements as viewed from outside the forming throat;

Figs. 41, 42, 43, and 44 are partially diagrammatic views illustrating stages in the forming of the box; and Figs. 45, 46, and 47, appearing on Sheet 13, illustrate mechanism for shedding or ejecting the formed boxes, Fig. 45 being a section at a location represented by the line 45—45, Fig. 36, Fig. 46 being a view of the mechanism of Fig. 45 as seen from the left in said figure and Fig. 47 being a skeletonized view of the operating mechanism for said shedding means.

Referring to the drawings in more particular, the entire organization may be seen in Figs. 1 and 2 as viewed together, and similarly in plan in Figs. 3 and 4. The several coordinated elements and groups of elements as there seen are adapted to receive and advance a blank from a supply, to perform the various operations of bending certain portions of the blanks and applying adhesive at appropriate points, and to present the conditioned blanks to forming mechanism which erects and secures the box in the final form for delivery. For convenience in manufacture, shipment and replacement of parts the apparatus as illustrated is built in sections or units, three in the present example, including the feed or intake, breaking and adhesive-rendering or gluing section or unit A, the intermediate conditioning and indexing unit B, and the forming and delivering unit C. From the following description it will be understood, however, that the line between the several units is to a large extent arbitrary and that the entire apparatus including the main frames 1, 1, of which three aligned sections are shown for each side of the machine may be structurally integral or may be constructed in any other convenient number of units. Viewing the machine in its entirety, the blank-advancing and conditioning mechanism of unit B, for example, and the blank breaking, gluing and advancing mechanism of the unit A are but elements of the one coordinated whole, and the same relation exists with respect to units B and C. Thus when reference is made to means for advancing, or for advancing and conditioning the blanks, such means may include elements of any and all the units A, B and C.

A typical form of blank is represented in Fig. 1ª. In this example it comprises the main wall $a$, which reference character will also be used to refer to the blank as a whole, side walls $b$, corner flaps $c$ and hinged intermediate or end pieces each including an end wall proper $d$, and an end turn-in piece or tuck $d'$. These blanks are previously cut, stamped or otherwise prepared, from paperboard, pasteboard, or other sheet material suitable for the formation of boxes such as here concerned. The term box is herein used throughout to refer equally to a bottom or container element and to a top or inverse cover element, either and both of which may be produced by the apparatus and in accordance with the method of the invention. As previously noted, the machine and method are also adapted for use in the manufacture of hinged or flap cover, one-piece boxes.

A stacked supply of the blanks $a$ is placed on the feed table or trough 2 between adjustable side guides 3, 3, substantially in the manner as illustrated in Fig. 1. The feed table may be positioned at the desired inclination as by means of adjustable uprights 4, 4 on supporting arms 5. The leading blank advances across a tilting spring-pressed retarding element 6 and is individually gripped between an overlying feed wheel 10 and an opposed feed roll 10ª, by which it is presented to the carrier belts 11. As seen in Figs. 3 and 4 a plurality of these carrier belts is provided, herein one belt near each side of the path of the blanks, and the construction is desirably such as to permit the belts and the associated elements to be adjusted transversely of the machine, within a substantial range, for cooperation with blanks of widely variant dimensions.

To this end the belts and associated parts are mounted on spaced carrier frames 12 supported for lateral adjusting movement on a plurality of cross rods 13, three of which are seen in Fig. 1. Adjustment of these carrier frames 12 may be effected by screw shafts 14 extending through the main frames 1 and through bosses on the carrier frames, as best seen on a large scale in Figs. 5 and 7. The screw shafts 14 at the respective sides have a sprocket and chain connection 15 whereby they may be turned together, as by means of the hand cranks 16, to move their frame and associated parts toward or from the center line of the machine to the extent desired. The adjusted position of the belts desirably is such that they will underlie the opposite end portions of the main wall $a$ of the blanks, with the outer edges of the belts substantially in vertical line with the fold lines between said main wall and the corner and end flap $c$, $d$ of the blanks.

The upper runs of the belts 11 by which the blanks are carried are guided in tracks 17 along the tops of the carrier frames, as well seen in Figs. 5 and 11. The belts travel about main pulleys 18, 18ª supported separately from the carrier frames, at the opposite ends of the latter, and downwardly about guide rolls 19 and 20 at the corresponding ends.

Cooperating with each feed belt is a series of spring-pressed feed rolls 21 adapted to engage the then upper faces of the blanks, to cause the latter to travel with the belts. These feed rolls are carried by longitudinal rails 22 overlying the respective belts and supported from the carrier frames by means of a plurality of yoke-shaped brackets 23, Figs. 3 and 5 to 7. Desirably said brackets are outwardly bowed substantially as illustrated to accommodate relatively large blanks in the direction transversely of the machine. The several feed rolls 21 are rotatably mounted on posts 25 slidable in blocks 26 laterally recessed for lengthwise adjustment along the rails 22, on which they are held in selected position as by set screws 26ª. Springs 27 surrounding the posts normally urge the latter and the rolls 21 downwardly into yielding engagement with the belts and the interposed blanks, the spring tension and the downward limit of movement for the rolls being adjustable as by the nuts 28 at the upper end of the posts. The rolls are aligned with the belts as by means of cross-pins 29 on their posts movable in corresponding slots in the blocks 26.

The main pulleys 18, 18ª for the feed belts are herein slidably splined on front and rear pulley shafts 30, 31. The inner or rear shaft 31, at the right in Figs. 1 and 3, is journaled in the main frames 1, and the belt pulleys 18ª thereon are shifted in conformity with the adjusted positions of the belt carrier frames 12 as by means of aligning plates 32 on the latter engaging in annular grooves in the hubs of said pulleys. Similar aligning plates 32 are provided at the front or left of the belt frames 12, and the belt guide rolls 19 at each end may conveniently be supported on said plates, the adjacent guide rolls 20 also having support on the frames 12.

The front pulley shaft 30, at the left in Figs. 1 and 3, is rotatably supported apart from the main frames, as by means such as best seen in Figs. 8 and 9. Said means includes an arm 36 at each side of the machine providing bearing support for the shaft 30, said arms being vertically rockable on a cross shaft 37 on the main frames 1. The shaft 30, which in addition to the belt drive pulleys 18 also carries, loosely, the lower feed roll 10$^a$, is urged yieldingly upward by springs 38 confined on posts 39 fixed at the inner ends of the shaft supporting arms 36 and extending loosely through blocks 40 held at a fixed level by studs 41 projecting from the adjacent main frames. Thus the lower feed roll 10$^a$ is held in yielding engagement with the upper feed element 10, so as to admit and feed the blanks between them. The shaft 30 is driven through a suitable chain or belt connection 44 with a cam shaft 45, having a similar connection 46 with a driven sprocket shaft 47. The shaft 31 at the right end of the belts is similarly driven by a connection 48 with said sprocket shaft 47; see Figs. 1-3.

The upper rotary feed element 10 in the illustrated example preferably has the novel construction best seen in detail in Figs. 8, 9 and 10. It comprises a central drum member 50 keyed on a shaft 51 journaled in the side frames 1. At the opposite faces of the drum are disks 52, 52 loose on the shaft 51 and held in place axially thereof as by the collars 53, 53. As seen in Fig. 9 these disks have a diameter somewhat greater than that of the drum so as to project peripherally beyond the latter to an extent substantially corresponding to that of the thickest blank. At any selected point about the drum there is set into the latter one or more, and preferably a group, of replaceable inserts 54 of cork, rubber or other material adapted to have non-slip engagement with the blanks. These inserts extend in a general radial direction with respect to the drum and project from the drum beyond the rims of the loose disks 52, their extent of projection being adjustable, for wear, or for different thicknesses of blanks, as by means of screw plugs 55 held in recesses 56 extending inwardly from the wells 57 into which the respective inserts are set.

The blanks are fed into the machine in individual succession, one blank to each rotation of the drum 50, as the inserts come around into engagement with each succeeding blank. During the major portion of each rotation of the drum 50, from one feeding position of the inserts or feeder elements 54 to their next similar position, the next approaching blank is held out of direct engagement with the drum 50 by means of the projecting loose disks 52. Since the latter are free on the shaft they do not advance the blank but serve rather to retard it and particularly also to avoid a continuous rubbing of the drum on the upper face of the next approaching blank. Hence objectionable marring of the upper faces of the blanks by dirt and waste accumulating from the feed table and elsewhere is prevented. This feature is especially desirable in the illustrated embodiment of the invention because the blanks enter the machine with their outer faces, which will be at the outside of the finished boxes, uppermost.

In their travel along the carrier belts 11 the blanks $a$ are individually acted on, herein as their first conditioning operation, by mechanism which initially "breaks" or flexes the corner flaps $c$ along their juncture line with the side walls $b$, and similarly bends the tucks or outer end flaps $d'$ along their juncture line with the end wall flaps $d$; see Fig. 1$^a$.

As best seen in Figs. 3 and 11, this breaker mechanism comprises four breakers in the form of bars 60, two at each side of the machine, one for each of the corner flaps $c$. There are also two similar but longer breakers 61, one at each side of the machine, for breaking down the tucks $d'$.

The several breakers are mounted on a vertically moving cross bar 62 supported at its opposite ends on plungers 63 carrying cam rolls 64 cooperating with cams 65 on the cam shaft 45 previously referred to. The entire breaker mechanism is urged downwardly as by the springs 66 surrounding the plungers 63 and bearing between abutments at the lower end thereof and fixed guides 67 on the adjacent side frames. The intermediate breakers 61, for the tucks $d'$, are carried by blocks 68 adjustable on longitudinal bars 69 carried by collars 69$^a$ for variable positioning along the cross bar 62, and the corner flap breakers 60 are similarly carried by arms 60$^a$ extending adjustably from and supported in said blocks 68.

It will be noted in Figs. 3 and 11 that the corner-flap breakers 60 are adjusted to lie substantially vertically opposite the outer edges of the carrier belts and their track, which in turn are opposite the line between the corner flaps and the blank side walls $b$. Hence the action of the breakers 60 is to break down the corner flaps $c$ along their juncture lines with side walls $b$. The tuck breakers 61 are adjusted to come vertically over the line between the tucks $d'$ and the end flaps $d$. The latter are supported adjacent said lines and in opposition to the breakers 61 as by bars 61$^a$, Fig. 11, held in blocks 61$^b$ adjustable along studs 61$^c$ projecting from the adjacent belt carrier frames 12.

During the flap breaking operation, the blank to be operated on is accurately halted in the proper position along the carrier belts to receive the action of the breakers. In Figs. 12 to 19 there is illustrated mechanism particularly suited for that purpose; see also Figs. 1 and 3.

As best seen in Fig. 12, said blank-halting means comprises, at each side of the machine, a hook-like finger 70 pivoted at 71 on a plate 72 hung on bosses 73, Figs. 13, 14, on a bracket 74 adjustably mounted on the adjacent roll-carrying rail 22, as by a removable attaching plate 74$^a$. Said brackets 74 are formed with sleeves 75 rotatably supporting a transverse rock shaft 76 on which are keyed arms 77 carrying rolls 78, pivoted thereon as at 79, one above each belt 11. The arms 77 are extended beyond the roll pivots 79 and are pivotally connected as at 80 with links 81 in turn pivoted at 82 to the adjacent stop finger 70.

In the position of the parts as in Figs. 12 and 14 the stop 70 is down, in position arresting the blank $a$. Down movement of the stops 70, to their position in Figs. 12 and 14 is caused by a clockwise rocking of the shaft 76, by the mechanism of Figs. 15 to 19, to be described. As said shaft is so rocked, the roll-carrying arms 77 are lifted, elevating the rolls 78 out of blank-feeding relation with their belts 11, and, through the link connections 81, tipping the stops 70 down to their positions as shown. Reverse movement of the shaft after the breaking operation lifts the stops 70 and allows the rolls 78 to drop onto the blank, thereby causing it to resume its travel with the belts 11.

The stop-supporting plates 72 may also carry supplemental spring-pressed feed rolls 83, Fig. 12 as by means of pivoted links 84. These rolls 83 are thus located close to the stops 70 and to the starter rolls 78 and assist in the smooth resumption of travel by the blanks following each breaking operation.

Referring now to Figs. 15 and 16, the rock shaft 76 above mentioned is herein operated by means of a lift-arm 85 keyed on it and carrying a lateral pin 86 in the path of a tappet-cam 87; see also Figs. 17 and 18. At its end adjacent the right side of the machine the rock shaft 76 bears in a block 88 adjustably positionable along a bar 89, Figs. 17 and 18, carried by brackets 90 having feet 90ª secured on the main frames. The brackets 90 are recessed in alignment to provide guides for a slide rod 91 on which the tappet-cam 87 is adjustably fixed. Said cam, bearing block 88 and shaft 76 are thus adjustable lengthwise the machine to conform to the adjusted position of the brackets 74 for the stop fingers 70.

The slide rod 91 is actuated by a bell crank 92, see particularly Fig. 19, pivoted on the adjacent side frame as at 93 and having its upper arm pivotally connected to the slide rod 91 as at 94. The other arm of the bell crank carries a cam roll 95 acted on by a cam 96 on the cam shaft 45 already referred to. Thus for each revolution of the cam 96 the slide rod 91 and tappet cam 87 thereon are moved to the left, into their position as seen in Fig. 18, to rock the shaft 76 in the clockwise direction, projecting the stop fingers 70 down into blank arresting position and lifting the re-starting rolls 78. Withdrawal of the stops and dropping of said rolls is effected by a spring 85ª, Fig. 16, as the cam means allows the arm 85 to move down.

In their further travel the blanks, still having their outer faces uppermost, are acted on by suitable means for rendering adhesive the desired parts, including at least the tucks $d'$ and permissibly any portion of the end wall flaps $d$ which, in the completed box, will be covered by the corner flaps and the tucks $d'$. The adhesive condition may be variously provided, for example, by moistening a pre-gummed surface, but generally by the application of adhesive material such as a glue, gum or paste, in a fluid or semi-fluid form. It will be understood that the term "glue" as used herein is intended to refer generally to any such adhesive. The total surface to be made adhesive may vary with different blanks, depending on the depth of the box and of the turned-in ends or tucks $d'$. In numerous instances it is not desirable to apply adhesive to the corner flaps, especially where they are deeper than the tucks, which would then not completely cover the adhesive surface of said flaps. Accordingly guides 97 desirably are provided which engage against the outer faces of the then down-turned corner flaps $c$ and hold them down out of engagement with the adhesive applying means, so that they pass the latter in vertical position, moving between the guides 97 and the carrier frames 12.

The intermediate flaps $d$, $d'$ meanwhile are suitably guided in the horizontal plane, so that the desired portions thereof may receive the adhesive. For applying the adhesive there are herein illustrated glue wheels 100, one at each side of the machine, rotatably supported on shafts 101 journaled in the adjacent main frames and projecting into glue pots 102. The latter and the adhesive or glue wheels are adjustable laterally of the machine together with the carrier frames 12, desirably being herein supported for such lateral adjusting movement by bosses 103 slidably received on the cross rods 13, 13 on the main frames. The adhesive or glue wheels are driven in any suitable manner, herein by chains 101$^x$ passing around sprockets on the glue wheel shafts 101 and corresponding sprockets on the sprocket shaft 47 previously referred to.

Beyond the adhesive-rendering or applying means, the blanks continue their travel toward the setting-up or forming mechanism which, under the present invention, is disposed in novel combination and arrangement with relation to the feeding and gluing means. As previously stated, the blanks are fed in, have their flaps broken, and are adhesively treated or glued with their ultimate outside faces uppermost. The forming plungers to be referred to herein operate downwardly from above the path of the blanks, the boxes are formed with their open or receiving end up, and are ejected downwardly for delivery, bottom wall foremost. It will be understood that in the case of separate covers, such cover elements are formed with their open end up and are similarly ejected as the boxes, that is, downwardly, with the main horizontal wall foremost, said wall, in the case of covers, being generally referred to as the top. In attaining this result the invention contemplates inverting the blanks and presenting them to the forming throat with their inner faces then being uppermost. Also in accordance with the invention the blanks are individually indexed and fed to the forming mechanism in accurately controlled sequence and in the course of a predetermined period following the application of the adhesive such as glue so calculated that the adhesive will have attained a condition of maximum adhesiveness or tackiness when the blanks are formed up and secured.

The several functions of advancing and inverting the adhesive blanks, indexing, and conditioning them are herein performed by the mechanism referred to for convenience in description as the unit B, seen in Figs. 2, 4, 20, and 21 to 25. Said mechanism comprises a main element herein termed the index wheel, indicated as a whole by the reference character B'. It includes one or more, preferably at least two, laterally spaced radial series of blank-conveying arms 105 projecting in the manner of spokes from hubs 106 on the indexing shaft 107. Each such arm comprises a pair of parallel spaced rods 105ª of a length to receive between them a major portion of any blank up to the capacity of the machine. The free ends of the rods 105ª are preferably out-turned as at 105$^b$ to form a mouth for receiving the leading edge of a blank and guiding the latter into holding engagement between the two members of the arms 105.

Desirably the blanks are additionally held in place during their travel about the index wheel, which travel herein is through 180°, by adjustable automatic clamping means such as seen in Figs. 2 and 20 and on an enlarged scale in Figs. 21 and 22, Sheet 3. Each such clamp or gripper, indicated as a whole by the numeral 108, comprises a block slidably received on the two parts 105a of the respective arm 105 and held in adjusted position as by a set screw 109. Housed in the block is a clamping ball 110 seated under a spring 111 adjustably held in place as by a screw plug 112. These clamping elements 108 are set at a radial position along the arms 105 according to the width of the particular blanks, so as to receive the then leading edge of each incoming blank. They are illustrated at their extreme inner positions in Fig. 2, and at an intermediate adjusted position in Fig. 20.

The index wheel B' is stepped around intermittently, clockwise in Figs. 2 and 25, moving at each step through an arc equal to that between successive arms 105. Each step brings an arm at the front or left of the wheel up into line with the path of the blanks on the carrier belts 11, in readiness to receive the next blank from the belts, and at the same time brings the diametrically opposite arm, at the rear or right of the wheel, into position to present a previously received blank to the feed means of the forming mechanism, to be described. While eight arms 105 are herein illustrated in each of the radial series of the index wheel, the arms being equally spaced 45° from each other, it will be understood that any desired number of arms may be used, depending largely on the proportions of the blanks and the feed rate and number of indexing steps desired, other determining factors being the character of the glue or adhesive employed, and the temperature and atmospheric conditions at the point of use.

The machine as a whole may be driven from any suitable source of power. In the illustrated embodiment a motor 113, Fig. 4, mounted on the frame of unit B directly drives a pulley 114 connected by a cross belt 115 to a pulley 116 at the high-speed end of a worm reducing gear 117 which operates the main drive shaft 118, Fig. 2.

The sprocket shaft 47 of unit A is driven from said main shaft 118 as by a chain 119. To the other side, toward the right in Fig. 2 a chain 120 connects said main drive shaft with a cam shaft 121.

The index mechanism above described is driven from said cam shaft 121 as by a chain 122 connecting it with a sprocket 123 on the index wheel drive shaft 124, Figs. 2, 23 and 24, a short shaft journaled in a bearing bracket 125 on the adjacent side frame. Said shaft 124 carries a rotary disk 126 to which the sprocket 123 may be secured as by the bolts 123a, Fig. 24. At one face of the disk 126 is a pair of diametrically opposed drive rolls 127 for cooperation with a Geneva gear 128, Figs. 2, 23 and 25, which in the form shown has four equispaced cam slots 128a for said drive rolls 127. Thus for each 180° rotation of the disk 126 the Geneva gear receives one 90° movement, intermittently.

As best seen in Fig. 25 the Geneva gear 128 is fast on a short shaft 129 journaled in a bracket 129a and in a bearing 129b on the adjacent frame 1. Outside the latter said shaft 129 carries a pinion 130, see also Fig. 4, meshing with a gear 131 fast on the index wheel shaft 107 supported by the main frames 1. Thus the index wheel is stepped around intermittently, to advance and invert the blanks in the manner previously described. The speed of the index wheel with relation to the other parts of the machine may conveniently be varied by substituting gears of different ratios for said gears 130, 131.

Each blank on reaching the horizontal position at the right of the index wheel, Figs. 2 and 20, is taken from the latter and positively delivered to the forming mechanism by feeding means adapted to move the blank at an increased speed as compared with that of its travel on the belts 11. One form of such means is seen in Figs. 26 to 29.

Referring to said Figs. 26 to 29, said accelerating feed means is supported as a unit on a fixed cross rod 140, see also Figs. 2 and 4, extending between the main frames 1 and having fixed thereon at each side of the machine a plate 141 carrying a plurality of belt guide rolls 142. Extending around each set of rolls is a belt 143 having an upper horizontal run in line with the path of the blanks as presented by the index wheel. Said belts 143 at the two sides are driven by pulleys 144 fast on a shaft 145 journaled in the main frames and driven as by a chain connection 146, Fig. 2, from the rear pulley shaft 31 of the carrier belts 11 of unit A, already described. The sprockets of said chain connection 146, and the pulleys 144, are proportioned to drive the belts 143 at the desired relatively high speed as compared with that of belts 11.

Each of the feed belts 143 has cooperating with it a plurality of overlying rolls, including a vertically swinging initial or blank-starting roll 147, an intermediate, fixed roll 148 and a rear, spring-pressed delivery roll 149. All three rolls are mounted on a rock shaft 150 journaled in the main frames 1, the intermediate rolls being loose on a sleeve 150a keyed on the shaft and the rear rolls 149 being rotatable on arms 149a loosely received on said sleeve and held down as by springs 149b, Fig. 28.

The vertically swinging receiving rolls 147 are each rotatably carried on a rock arm 151 projecting from the corresponding sleeve 150a. Said arms 151 and their rolls 147 normally are elevated, in the full line position of Fig. 26, but are adapted to be brought down, into the dotted line position in said figure and as seen in full in Fig. 2, to cause the roll 147 to engage the then upper surface of the blanks and rapidly advance them to the forming throat. It will be understood that as the index wheel is stepped around to present a blank $a$ in the position represented in Fig. 26 said rolls 147 remain up to admit the leading portion of the blank, until the latter reaches a position below them, whereupon the rolls drop onto the blank and engage it in feeding relation with the belts 143, thereby withdrawing the blank from the index wheel and feeding it rapidly to the forming mechanism.

The vertically swinging rolls 147 are operated in the proper timed relation with the index wheel, herein through suitable cam mechanism such for example as represented at the right in Fig. 29. As there seen, the cam shaft 121 previously referred to carries a cam 152 cooperating with a cam roll 153 on a cam lever 154 held down by a spring 154a, said lever being loose on a cam lever shaft 155 on the main frames; see also Fig. 2. Pivotally connected to the cam lever 154 is a link 156 pivoted at its upper end as at 157 to one arm of a bell crank 158 loosely supported for rocking movement on the fixed cross rod 140 previously referred to. The other arm of said bell crank comprises a tappet 158a engaging behind a pin 159 on a collar 159a keyed on the roll-supporting shaft 150. A finger 150b also keyed on said shaft 150 has connected to it a spring 150c which acts to swing the movable feed rolls 147 down into engagement with the blanks when permitted to do so by dropping of the cam roll 153 into a depression of the cam 152. Said rolls 147 are again elevated, after each feed action, by return movement of the tappet 158ᵃ to the left in Fig. 29, as controlled by the cam 152.

As each blank is advanced from the index wheel to the forming throat by the accelerating feed means described, it desirably is supported at one or more positions intermediate the feed belts 143. In the present example, one such supporting element is illustrated; see particularly Figs. 29 to 31.

Referring to said figures, said supporting element is located substantially centrally of the machine and comprises a horizontally movable blank-supporting bar 160. On the under face of said bar is a rack 161 meshing with a segment gear 162 on an arm 162ᵃ loose on a shaft 163 journaled in the main frames; see also Fig. 2. The bar 160 and rack 161 are supported for sliding movement by a pair of brackets 160ᵃ, Figs. 29 and 31, rising from a collar 160ᵇ on the fixed cross rod 140 previously referred to. The segment arm 162ᵃ carries at its base a short rock arm 164 which is pivotally connected as by a link 165, Figs. 29 and 30, with the same cam lever 154 previously described in connection with the operation of the swinging feed rolls 147. Thus when said swinging rolls are dropped to advance a blank, the blank-support bar 160 is advanced horizontally below the intermediate portion of the blank, toward the right in the figures, substantially simultaneously with the travel of the blank. In this manner the blanks, and particularly the larger ones, are positively supported along their path substantially fully to the forming throat, assuring their accurate delivery thereto with the avoidance of jamming or other irregularity of feed.

As a further precaution, and to insure accurate alignment of the blanks relative to the forming throat, additional justifying means may be provided, such means being herein seen in Fig. 2 and separately upon a larger scale in Fig. 32, on the last sheet of drawings. In the illustrated form said means comprises justifying fingers 170, one to each side of the midline of the path of the blanks. Said fingers are fixed on and depend from a rock shaft 171 carried by brackets 172 projecting rearwardly from the top cross frame 173 near the rear of the machine, see Fig. 33, and which supports the forming plungers to be referred to.

The justifying fingers 170 are operated through suitable connections, herein from the cam shaft 121 already mentioned. As seen in Fig. 32 said cam shaft carries a cam 174 cooperating with a cam roll 174ᵃ on a cam lever 174ᵇ movably supported on the cam lever shaft 155 also previously mentioned. Said cam lever 174ᵇ is connected through a pivoted link 175 with an arm 176 loose on the shaft 150 on which the swinging feed rolls 147 are mounted. The arm 176 is in turn connected through a pivoted link 177 pivotally attached selectively as at either 178 or 178ᵃ to an arm 170ᵇ fast on the finger-supporting rock shaft 171. The operation of the latter is so timed that the fingers 170 swing rearwardly, toward the right in Figs. 2 and 32, and move along immediately behind the blanks, following them up as they are delivered to the forming throat, so as to justify them completely and accurately, correcting for any possible rebound or other irregularity in positioning of the blanks.

The blanks are halted over the feed throat and properly lined up with it, in cooperation with said justifying fingers 170, by means of adjustable stops 179, Figs. 2 and 34. Any suitable number of such stops are distributed across the path of the blanks, in position to abut their leading edges. As illustrated they comprise blocks adjustable toward and from the feed throat on studs 179ᵃ projecting from collars adjustably secured along a cross rod 179ᵇ on the main frames.

As previously noted, the blanks from the supply enter the machine with their outer faces up, but as delivered to the forming mechanism they have been inverted, through the medium of the index wheel. Hence a blank a in readiness to be acted on by the setting up or forming mechanism, in the position as indicated at the right in Fig. 2 and in the diagrams Figs. 41 to 44, has its inner face uppermost. The blanks accordingly are disposed for cooperation with downwardly-acting forming means which causes the side and end walls to be erected upwardly, so that each box as formed occupies its ordinary use position, with its main or bottom wall down and its side walls rising from it.

The forming throat, previously referred to at various points herein but not earlier described, comprises the rectangular or other enclosure or passage in which the side members of the boxes are erected and secured. The elements which define the throat are seen separately, on a relatively large scale, in Fig. 36 and some or all of them appear also in Figs. 2, 4, 33 and 38, and in the partly diagrammatic Figs. 41 to 44. Said elements comprise a series of opposed folder plates, abutments or wall members 180 extending crosswise the machine, for acting on the longer walls or sides b of the blanks. As shown, said members are in the form of individual plates at the inner ends of slides 180ᵃ adjustably fixed in collars 180ᵇ distributed adjustably along parallel cross bars 181, 182 supported in the main frames 1 of the rear or C unit of the machine. The other walls of the forming throat, in the direction lengthwise the machine and corresponding to the shorter side or end walls of the boxes are defined by presser plates 183 having bearing sleeves 184 whereby they are supported for horizontal movement toward and from each other on the cross bars 181, 182.

The erecting and securing of the blanks into box form is accomplished by the downward entrance of a double plunger element into the forming throat, in cooperation with the fixed and the movable elements of the latter. Said plunger element, as best seen in Figs. 2, 33, 34, 38 and the diagram Figs. 41 to 44 comprises a horizontally disposed forming plate 185 removably attached at the foot of an inner or central vertically reciprocable slide-bar 186. Said inner slide-bar is guided within an outer slide 187, so that the two may at times move relatively to each other, said outer slide 187 being guided in ways on the cross frame 173, as at 187ᵃ and 187ᵇ, Figs. 2, 33 and 34. The box-like former 188 is replaceably attached to the lower end of said outer slide 187.

The forming plate 185 and the former 188 which together comprise the double-plunger forming element are actuated in proper timed relation, herein from the cam shaft 121 previously mentioned.

Referring to Figs. 2 and 33, said cam shaft 121 has fast on it, near its left end in Fig. 33, a path cam 190 having at its outer side face a cam slot for a cam roll 191 on a lever 192 loose on the cam lever shaft 155 referred to previously; see Fig. 2. Pivotally connected to said lever 192 at 193 is an adjustable link 194 extending upwardly and pivoted at its upper end, as at 195, to an arm 196 fast on a rock shaft 197 in bearings on the brackets 172 already described in connection with the justifying fingers 170. Said rock shaft has centrally fixed on it a lever 198 the rear end of which is connected by a pivoted link 199 to the inner slide-bar 186, for the forming plate 185.

The outer slide 187, for the former 188, is similarly operated from a path cam 200, Fig. 33, near the other end of the cam shaft 121, and actuating a cam roll and lever 201 having connected thereto an upwardly extending adjustable link 202. Said link 202 is pivoted at its upper end, as at 203, Figs. 2, 33 and 34, to an arm 204 fast on a further rock shaft 205 journaled in the brackets 172. On said rock shaft 205 are secured, in the same angular relation, a pair of levers 206, Figs. 2, 33 and 34, pivotally connected at their rear ends by links 207 to the outer slide 187, for the former 188.

The operation of the forming mechanism will readily be apparent from the partly diagrammatic views showing several stages thereof, Figs. 41 to 44. Fig. 41 shows a blank $a$ in position over the forming throat, substantially as also seen in Fig. 2. As the next step the forming plate 185 is brought down first, separately from the former 188, thereby moving the main horizontal wall or bottom $a$ of the blank down into the throat and erecting all the wall flaps, both for the longer or side walls $b$ and for the other side or end walls $d$. The resulting position of the parts is represented in Fig. 42. It will be noted that at this stage the tucks $d'$, while bent in to some extent by reason of the previous action of the breaker mechanism of unit A, still stand above the end walls $d$.

It will also be understood that the forming or erecting plate 185 cooperates with folder points, projections or turning devices 180$^c$ extending above and inwardly of each of the four corner folder or abutment plates 180; see Figs. 33, 36 and 46. Said folder points 180$^c$ act to turn the corner flaps $c$ inwardly and downwardly as the side walls $b$ are erected, so that in the condition illustrated in Fig. 42 and in Fig. 1$^b$ said corner flaps stand upright against the inner face of the end walls $d$, in readiness to have the tucks $d'$ turned inwardly and downwardly over them.

By the next operation, represented in Fig. 43, the tucks $d'$ are bent inwardly and downwardly, by the action of tucker elements or tucking fingers 210, to be described. Said tuckers are swung in, from their normal positions as in Figs. 41 and 42, so as to engage and fold down the tucks $d'$, substantially in the manner as would be done by the fingers of a human hand. The action of these tuckers is rapid, and they are swung in, to the position of Fig. 43, and then out again during the brief interval between descent of the forming plate 185 as in Fig. 42 and the following descent of the former 188 to the position of Fig. 44.

By mechanism to be described the end presser plates 183 are moved inwardly toward each other, as represented in Fig. 44, while the former 188 is in down position within the box, thereby securing the glued face of the tucks $d'$ to the adjacent portion of the then inturned corner flaps $c$ and any opposed surface at the inner face of the end walls $d$ which is not covered by said corner flaps. Because of the efficient conditioning of the blanks and the tempering of the glued portion, during their passage from the gluing means to the forming throat, so that the adhesive is at its maximum state of tackiness at the time when the presser plates 183 perform their pressing operation, said operation may be relatively rapid, as compared with prior practice and the pressure need be but substantially instantaneous rather than being maintained for a marked interval. Accordingly, after the brief pressure application as represented in Fig. 44, the presser plates 183 are moved out. Substantially at the same time, the forming plate 185 and the former 188 are retracted upwardly, both moving together, to the position of Fig. 41, in readiness to repeat the cycle with the next following blank.

The boxes are shed or ejected downwardly, herein by mechanism to be described and which is independent of the double plunger device 185, 188. This feature makes for further rapidity of the forming cycle, since it avoids a further movement of the plunger device in the forming or down direction after the action and withdrawal of the presser plates 183, and allows the plunger device to return directly from its position of Fig. 44 to its initial position of Fig. 41.

Turning now to the tucker mechanism and its operating means, Figs. 2, 33 and particularly Figs. 36 to 40, a plurality of the tuckers or tucking fingers 210 are distributed along the upper inner edges of the presser plates 183, in recesses in said plates, see Fig. 40 and also Figs. 41 to 44, four such tuckers being shown at each end of the forming throat in the present example. Extra recesses for additional tuckers, or for different arrangement thereof, for different sizes of blanks are indicated at 210$^a$, Fig. 36. These tuckers of each series are fixed on a rock shaft 211, one for each presser plate 183, having at their rear ends small pinions 212, Figs. 36 and 39, meshing with racks 213 sliding in guides 214 on the bearing sleeves 184 for the rear cross bar 182. Each shaft 211 is supported on and extends along the corresponding end presser plate 183.

Each rack 213 has pivoted at its outer end, as at 215, Fig. 38, an upright lever 216 rigidly secured in the rear end of a hub 217 on a fixed pivot stud 217$^a$. Each such hub 217 carries an arm 218 pivotally connected by a short link 219 with the outer end of a horizontal bar 220 slidably supported in guides 221, 221 on the adjacent portion of the cross frame 173.

At the adjacent inner ends of each slide bar 220 is a cam roll 222, Figs. 33 and 38, received in a cam slot 223 on a common cam plate 224 attached to a carrying strap 225 fast on upper and lower studs 226 extending rearwardly from the outer slide 187, which supports the vertically reciprocating former 188. It will be seen that the cam slots 223 have short portions 223$^a$, Fig. 38, offset inwardly and oppositely toward each other. Hence as the former slide 187 and the former 188 move down, but before the former 188 enters the forming throat, the slide bars 220 receive a rapid inward and return movement which is communicated through the described connections to the racks 213, giving each a quick outward movement, oppositely and away from each other, and the reverse. Said outward rack movement, toward the left in Fig. 39, turns the tucker shafts 211, through the pinions 212, thereby to tip the tuckers inwardly to their positions as in Fig. 43 and again to withdraw them before the former 188 enters the throat.

It remains to describe the means for operating the presser plates 183, and also the mechanism for shedding the completed boxes.

Said presser mechanism is best seen in Figs. 33 and 35, portions thereof also being seen in Figs. 2 and 4. Duplicate mechanism is provided for each presser plate 183, at the two sides of the machine, and but one set of parts need be described, corresponding parts of each set being similarly numbered. Referring for example to the parts in lower right in Fig. 33, the presser plate 183 carries outwardly extending arms 230, see also Fig. 4, rotatably supporting a horizontal bar 231. Extending adjustably through said bar is a threaded thrust pin 232 forming one element of a toggle and having a pivoted connection at its outer end as at 233 with the opposed element of the toggle. The latter comprises a yoke-like thrust lever 234 having a horizontal portion trunnioned in a bracket 235 on the main frame 1. Said bracket also carries outer collar supports 184ᵃ for the two cross bars 181, 182 on which the presser plates 183 slide.

The thrust lever 234 has an inner downwardly extending portion providing a seat for the upper end of a compressible link connection 236, seen separately in Fig. 35, with a cam lever 237, Fig. 2, supported on the cam lever shaft 155 previously mentioned, and operated by a cam 238 on the cam shaft 121. Suitable springs, not shown, act to hold the toggle means 232, 234 in the down or broken position as in Fig. 33 and hence to hold the presser plates 183 yieldingly in, and to return them to, their outer or open position as in said figure.

As seen in Fig. 35, the compressible link connections 236 comprise upper and lower sleeves 236ᵃ, 236ᵇ, each having a ball member for reception in sockets in the thrust lever 234 and the cam lever 237 respectively. A rod 236ᶜ is adjustably threaded in one sleeve, herein the upper sleeve 236ᵃ, and is slidable in the other, lower sleeve 236ᵇ, with respect to which it is held in place by a pin 236ᵈ. A coil spring 236ᵉ surrounding said rod below a nut threaded thereon, and whereby the spring tension can be regulated, tends to force the two sleeves apart but permits them to yield toward each other. Upward action of the cam lever 237 upon the described link connection 236 as a whole accordingly applies a yielding pressure upon the toggle means 232, 234 and urges the presser plates 183 yieldably inwardly against end walls of the box, during the operation illustrated in Fig. 44, under an accurately controlled pressure.

It should be noted, particularly with reference to Figs. 41 to 44 that the presser plates 183 carry at their lower inner edges interrupted flange members 183ᵃ having a short extent into the feed throat so as to act as stops for the blanks as they are carried down by the forming plate 185 in the step shown in Fig. 42. To allow for subsequent shedding of the boxes, the cams 238 controlling the presser bars 183 are shaped and timed to present the latter at the proper inward position to receive the blanks on said flanges 183ᵃ at the time of the Fig. 42 setting-up operation, subsequently to effect their further inward pressing action as in Fig. 44, and immediately thereafter to cause the outward withdrawal of said presser plates sufficiently to allow the boxes to clear said flanges 183ᵃ and to pass downwardly through and out of the forming throat.

Positively to insure the shedding or delivery of the boxes, shedding means desirably is provided, herein operated separately from the double-plunger forming devices 183, 188. One form of such means is illustrated in Figs. 45, 46 and 47, and on a small scale, sufficiently to show its location, in Figs. 2, 4 and 36. Referring first to Fig. 45, one or more hooks 240 are supported by spring strips 241 for yielding movement into and from the feeding throat, so as to hook over the top edge of a box *a* therein. In the present example two such hooks 240 are provided, one at each side of the machine and operatively supported herein on the corner side-wall plates 180 at the inner side of the forming throat. Said hooks 240 as seen in Fig. 45 are formed with an inwardly inclined upper cam-like face 240ᵃ, whereby they are cammed outwardly by the blanks entering the forming throat, in the operation illustrated in Fig. 42, and then spring in over the top edge of the erected box or blank to the position substantially as shown in said Fig. 45.

The spring strips 241 supporting the hooks are carried on slides 242 guided for vertical reciprocating movement in slots 243, see also Fig. 46, in the respective side plate members 180. Each slide 242 is attached at the upper end of an upright 244 which is pivotally connected through a link 245 with an arm 246 fast on a rock shaft 247 having bearings in hangers 248 depending from the horizontal supporting element 180ᵃ of the corresponding side wall plate 180 of the forming throat.

As seen in Figs. 45 and 47 the shaft 247 and arms 246 are rocked at the proper time, that is, immediately following upward withdrawal of the double-plunger devices 183, 188 from their final down position of Fig. 44, thereby to draw down the shedders 240 and free the boxes from the forming throat. Said operation of the shedders is herein effected through suitable connections including a link 249 pivotally connected at its upper end, as at 250, to one of the arms 246 and at its lower end pivoted as at 251 to a cam roll lever 252 on the cam lever shaft 155 previously referred to. A cam roll 253 on said lever cooperates with a cam 254, see also Fig. 33, on the cam shaft 121 of unit C. Suitable spring means such as indicated at 252ᵃ Fig. 47 is provided for maintaining the operative relation of the described parts.

The completed boxes as they are shed or dropped from the forming throat may be collected in any suitable manner as upon a platform or in a receptacle. Desirably they are automatically conveyed from the machine to any convenient collecting and packing station. For this purpose there is herein represented in Fig. 2 a conveyor belt 260 disposed below the forming throat in position to receive the boxes as they drop from it. Said conveyor belt is supported at its inner end as by a broad pulley 261, Fig. 33, on the cam shaft 121 and at its outer end by a similar pulley 262 on any convenient stationary part.

From the foregoing description taken in connection with the drawings it will be understood that the invention includes the method and means whereby box blanks are fed from a supply with their outer faces uppermost and in the course of their travel are inverted and presented to vertically operating forming mechanism with their inner faces then uppermost, so that the forming mechanism may operate downwardly in setting-up and securing and shedding the boxes which may then be delivered downwardly, by gravity or otherwise, to a receiving station or conveyor. Further, in the course of the passage of the blanks through the machine, and following the application of glue to the desired parts, the travel of the blanks is so indexed and timed that the glue is tempered to its maximum condition of tackiness, having in consideration the attendant circumstances at a given point of use. By reason of the predetermined and accurately controllable time period established between the gluing operation and the setting-up and securing operation a maximum security for the adhesively connected portions of the boxes is insured without curtailing production.

It will be understood that my invention, either as to means or method, is not limited to the exemplary embodiment or steps herein illustrated or described, and I set forth its scope in my following claims.

What is claimed is:

1. In a machine for making paper boxes from prepared blanks, in combination, a support for a supply of blanks, feed means to select and advance individual blanks, continuously travelling substantially horizontal endless conveyor means to receive and forward the blanks serially, flexing mechanism and associated stop means temporarily to halt each blank and to flex it along desired fold lines, adhesive applying means operable on portions of the blanks during their further travel with said conveyor means, forming mechanism to erect and secure the adhesive blanks in tray form, and indexing transfer mechanism operatively disposed between said conveyor means and the forming mechanism, comprising a rotary wheel having a plurality of elongated radial blank receivers, said wheel having its axis transverse of the path of the blanks coming from the adhesive-applying means and in a plane the same or paralleling said path, and means to turn the wheel intermittently to bring each blank receiver successively into registry with the conveyor means to receive an adhesive-carrying blank therefrom and simultaneously to position another receiver to present a previously received blank to the forming mechanism, said wheel being timed, proportioned and arranged to afford a predetermined conditioning period for the adhesive on the blanks.

2. In a machine for making paper boxes from prepared blanks, in combination, a support for a supply of blanks, feed means to select and advance individual blanks, conveyor means to receive and forward the blanks serially, adhesive-applying means operable on portions of the blanks during their further travel with said conveyor means, vertically reciprocating forming mechanism to erect and secure the adhesive blanks in tray form, and a rotary blank-transferring wheel having a plurality of elongated radial blank receivers, said wheel operatively disposed between said conveyor means and the forming mechanism, and having its axis transverse of the path of the blanks coming from the adhesive-applying means and in a plane the same or paralleling said path, and means to turn the wheel intermittently to bring each blank receiver successively into registry with the conveyor means to receive an adhesive-carrying blank therefrom and simultaneously to position another receiver to deliver a previously received blank in inverted position.

3. In a machine for making paper boxes from prepared blanks, means to advance individual blanks horizontally from a supply, means for applying adhesive to selected portions of the blanks so advanced, forming mechanism including a throat and cooperating plunger devices to erect the blanks into tray form wherein the adhesive portions receive other portions flatwise against them, presser means to secure the adhesive portions when so positioned, a series of radial blank-holding arms revoluble in a vertical plane between the adhesive applying means and the forming throat, said arms adapted successively to register with and receive each an adhesive blank from the advancing means, mechanism to revolve said arms step by step, and other conveyor means to withdraw the blanks from said arms at the level of the forming throat and to deliver them to the latter at positively determined intervals calculated to bring the adhesive to its maximum adhesive efficiency at the time of such delivery.

4. The method of forming paper boxes from individual prepared blanks having side, end and corner flaps, which comprises feeding individual blanks from a supply and advancing them flatwise substantially horizontally and with their outer faces uppermost, rendering adhesive portions of the blanks to be secured, intermittently moving each blank through a series of steps in the course of which the blank is inverted from outer face to inner face uppermost, exposing said blanks to atmosphere during said intermittent movement thereof and thereby tempering the adhesive to a tacky condition, delivering the blanks inner face uppermost to a forming station and there erecting sidewall portions of the blanks by directing pressure downwardly on their main horizontal portions, applying pressure to the adhesive portions to secure them in set-up position, and delivering the set-up boxes downwardly from the forming station.

5. The method of forming paper boxes from individual prepared blanks which includes the steps of advancing the blanks horizontally in series with their outer faces up, applying adhesive to portions of the then under faces of the blanks, angularly moving each adhesively treated blank about an axis coincident or parallel with its initially leading edge in such manner as to invert the blanks to present their inner faces uppermost while simultaneously exposing the blanks to atmosphere and timing said movement to temper the adhesive on the blanks to the desired condition of tackiness, and setting up and adhesively securing said blanks in box form.

6. In a machine for forming paper boxes from individual blanks, in combination with means to advance the blanks and to render adhesive desired portions thereof and means to form up and secure the adhesive blanks, indexing transfer mechanism to receive the blanks from the adhesive-rendering means and to present them in registered position to be acted on by the forming means, said mechanism including an index wheel rotatable on a horizontal axis and having a series of radial angularly spaced blank-supporting elements, and drive means to turn the index wheel intermittently, said blank advancing means acting to deliver an adhesive-carrying blank to each such supporting element of said series as it reaches a receiving position, and conveyor means to engage and remove the blanks at a delivery position spaced angularly from said receiving position, for presentation to the forming-up means.

7. In a machine for setting up paper boxes from individual prepared blanks, indexing transfer mechanism for the blanks comprising a horizontal rotary supporting shaft, a hub on the shaft, a radial series of equally spaced arm elements projecting from the hub, each such element including two substantially parallel spaced elongated holding members adapted to receive and hold a blank between them, and variable means on said elements to position the blanks at predetermined distances from the shaft axis.

8. In a machine for making paper boxes from individual prepared blanks, in combination with a frame and blank feeding means thereon, throat and plunger means for setting up the blanks, and mechanism associated with said feeding means to deliver individual blanks to the setting-up means at regular intervals, said mechanism including an indexing element intermittently rotatable in the vertical plane of the feeding means, spaced blank-carrier devices thereon adapted each in turn to receive a blank from the feeding means, a traveling conveyor in the path of the blanks as they reach a given position of the indexing element, said rotary indexing element acting to present one face of leading portions of the blanks into contact with said conveyor and movable means cooperating with the conveyor to engage the opposite face of each blank as it reaches said position thereby to grasp and withdraw it from the indexing element for further travel with said conveyor.

9. In a machine for setting up individual prepared blanks to form boxes, mechanism for erecting and securing the wall-forming portions of the blanks, said mechanism comprising opposed side wall plates and end wall pressers defining a forming throat, said pressers being mounted for rectilinear reciprocating movement toward and from each other to press upon the box end walls, the blanks having end wall flaps including inner and outer portions, rock shafts carried by and moving with the pressers at opposite sides of the throat, blank-engaging finger means on said shafts, and mechanism to turn said shafts thereby to cause said finger means to engage and bend said outer flap portions inwardly and downwardly in advance of the inward pressing movement of the pressers.

10. In a machine for setting up prepared blanks to form paper boxes, in combination, means to render adhesive desired portions of the blanks, forming mechanism, rotary carrier means to advance the adhesive-carrying blanks individually and at a given rate of travel and to present them at a location adjacent the forming mechanism, and accelerating mechanism to take each blank successively and deliver it to the forming mechanism at an increased rate of travel, said mechanism comprising a relatively high-speed endless conveyor having a portion paralleling and overlapping the leading portion of a blank as it is presented by said advancing mechanism, and an opposed member having a freely movable surface, said member supported for bodily movement toward and from the conveyor thereby to engage each presented blank between its freely movable surface and the opposed surface of the conveyor, to effect the rapid delivery of the blank to the forming mechanism, and follow-up means to insure accurate registration of the blank with the forming mechanism.

11. In a machine for making paper boxes from individual blanks having flaps to be infolded at one or more vertical walls of the box, in combination with means for presenting the blanks, means defining a forming throat across which the blanks are presented, said means including external rectilineally movable presser members at two opposed sides of the throat, double plunger mechanism operable to set up the blanks in said throat, said mechanism including a forming plate and a subsequently acting forming block, tucker fingers adjacent opposite walls of the throat, along the upper portions of said presser members, a shaft on, and paralleling the inner face of, each presser member and supporting said fingers for movement with the presser members and for rocking movement into and from the throat, and means coordinated with the plunger mechanism to rock said shafts to move said fingers inwardly and to withdraw them in the period between the actions of the forming plate and the forming block, thereby to turn in the flaps of the blanks for further engagement by the forming block.

12. In a paper-box machine, wall means defining a forming throat across which the blanks are presented, plunger mechanism to move the blanks into and set them up and secure them in the forming throat, said plunger mechanism having a movement limited to entrance into and reverse withdrawal from the throat as contrasted with a movement through and beyond the throat, a shedder element slidably mounted on a wall of the throat and yieldably movable transversely of the throat to admit the blank for setting up and to engage over a portion of each set-up box, and means operating in timed relation with the plunger mechanism to reciprocate the shedder element in a direction through the throat, to shed the set-up boxes from the latter at its open portion opposite to that at which the plunger mechanism enters.

13. In a box-making machine, in combination, spaced side frames, a support at one end for a supply of separate blanks having lateral portions marked for folding, a plurality of substantially horizontal endless conveyors lengthwise the machine and adjustable laterally thereof to underlie portions of the blanks adjacent and inwardly of their lateral portions to be folded, drive means to move said conveyors continuously, vertically movable breaker means supported above the path of the blanks and in line with fold lines thereof which extend lengthwise the machine, supporting means on the side frames for said breaker means and whereon the latter are adjustable laterally of the machine, intermittently actuated means to halt each blank at the breaker means, and actuating mechanism to depress the breaker means into flexing engagement with each blank while so halted.

14. In a box-making machine, in combination, spaced side frames, conveyor means thereon to advance and position blanks having at opposite sides, laterally of the machine, a plurality of flap portions defined by lines lengthwise the machine, a cross member on the side frames, means to reciprocate said cross member vertically, said cross member having, for each side of the machine, a supporting element adjustable along it, crosswise of the machine, a blank engaging breaker member carried by said supporting element, longitudinal bars projecting oppositely from said element, a longitudinally adjustable block on each bar, and other breaker members mounted on each of said adjustable blocks with capacity for adjustment relatively thereto in the direction laterally of the machine, said breaker members adapted to flex vertically said lateral flap portions of blanks of different sizes and shapes.

15. In a box-making machine having breaker means according to claim 14, a plunger on each side frame and supporting the breaker-carrying cross member between them, cam means to elevate the plungers to lift the breaker members above the path of the blanks, said cam means shaped to permit descent of the breaker members at the desired timed intervals, and spring means to move said plungers and breaker members downwardly at said times.

16. In a box-making machine, laterally spaced, continuously movable endless conveyors for blanks, a blank breaking or flexing station along said conveyors, and blank halting means adjacent each conveyor, said means comprising a roll movable vertically into and out of feeding relation with the corresponding conveyor, a rock arm supporting the roll for said movement, a stop finger on a stationary pivot adjacent the roll, means to rock said arm, and link connections between the arm and the stop finger to position the latter in front of a blank when the roll is moved out of feeding relation, and to withdraw the finger on return of the roll.

17. A box-making machine according to claim 16 wherein said blank halting means, each as a unit, are bodily adjustable laterally of the machine for cooperation with blanks of different sizes.

18. A box-making machine according to claim 16 including a longitudinal rail above each conveyor, a bracket on each rail and adjustably positionable along it, said rock shaft, rolls and stop fingers being mounted on said brackets, for variable positioning lengthwise the machine for cooperation with blanks of different sizes.

19. In a box-making machine, spaced side frames, conveyor means thereon to advance blanks in series along a substantially horizontal path, a cross shaft journaled on the side frames beyond said conveyor means, a plurality of hubs fixed on the cross shaft at opposite sides of the longitudinal center line of the conveyor means, each hub having fixed therein a plurality of pairs of elongated radial forked arms equally spaced circumferentially, corresponding arms of each hub being aligned transversely of the machine, said arms being of a length to receive edgewise in their forked portions blanks of different dimensions lengthwise the machine up to the capacity thereof, yieldable blank engaging means on each arm and adjustable lengthwise thereof to position different sizes of blanks with their initial trailing edges equally distant from the axis of said cross shaft, and means intermittently to turn the shaft to bring each aligned pair of arms successively into registry with the path of the blanks along said conveyor means.

20. In a box-making machine, a blank transfer wheel rotatable on a horizontal axis, said wheel comprising a series of radial arms each providing an elongated slot-like formation for receiving blanks edgewise, and automatic clamping means adjustably positionable along each arm for holding engagement with blanks at variable distances from the wheel axis.

21. In a box-making machine, a blank transfer wheel rotatable on a horizontal axis, said wheel comprising a series of radial arms each providing an elongated slot-like formation for receiving blanks edgewise, and stop means variably positionable along each arm to limit the extent of insertion of the blanks.

22. In a box-making machine, a blank transfer wheel rotatable on a horizontal axis, said wheel constructed and arranged to invert and forward blanks singly in timed succession and comprising a series of radial arms each providing an elongated slot-like formation for receiving blanks edgewise, means for determining the extent of insertion of the blanks, intermittent gearing for rotating the wheel step by step, and means to actuate said gearing.

23. In a box-making machine, in combination, a traveling conveyor for advancing blanks in succession along a substantially horizontal path, a second conveyor beyond and spaced from the first in the direction of travel of the blanks, a rotary transfer wheel on a transverse horizontal axis between the two conveyors and having a radial series of blank holders each adapted to take a horizontally disposed blank from the first conveyor, move it through approximately 180° of arc about the wheel axis while maintaining the radial relation of the blank thereto and to present the blank to the second conveyor, flatwise and in inverted position, a main drive element, drive connections between the latter and the first conveyor, operating connections between the two conveyors for driving them in timed relation, and gearing connections between said drive element and the transfer wheel to turn the same step by step, bringing each succeeding blank holder into register with the first conveyor to receive the foremost blank advanced by the latter.

24. In a box-making machine, a rotary transfer wheel having a horizontal axis and means for holding blanks in radial planes about said axis, means to turn the wheel step by step to present the blanks successively in substantially horizontal position, means for grasping a leading portion of each blank so presented and withdrawing it from the wheel for further advance, a reciprocable guide member positionable to underlie each blank as presented by the wheel, and actuating means for moving the guide member forwardly with the blank additionally to support it as it is withdrawn and advanced from the wheel.

25. In a box-making machine, a rotary transfer wheel having a horizontal axis and means for holding blanks in radial planes about said axis, means to turn the wheel step by step to present the blanks successively in substantially horizontal position, means for grasping a leading portion of each blank so presented and withdrawing it from the wheel for further advance, said means comprising a pair of laterally spaced belts each having a substantially horizontal run in the plane of the presented blanks, means to move the belts continuously, a freely rotatable roll supported above each belt for bodily movement to and from blank-feeding relation with them, means to elevate said rolls to permit the leading portions of the blanks to be swung down by the transfer wheel into flatwise engagement with the belts and means yieldably to depress the rolls into feeding relation with a blank so received on the belts.

26. In a box-making machine, a rotary transfer wheel having a horizontal axis and means for holding blanks in radial planes about said axis, means to turn the wheel step by step to present the blanks successively in substantially horizontal position, a plurality of endless conveyor elements in the plane of the blanks so presented, vertically movable means cooperable with the conveyor elements to grasp and withdraw the blanks from the transfer wheel, and guide means underlying the positioned blanks and movable therewith during their travel with said conveyor elements.

27. In a box-making machine, a rotary transfer wheel having a horizontal axis and means for holding blanks in radial planes about said axis, means to turn the wheel step by step to present the blanks successively in substantially horizontal position, a plurality of endless conveyor elements in the plane of the blanks so presented, vertically movable means cooperable with the conveyor elements to grasp and withdraw the blanks from the transfer wheel, a slidable guide between and paralleling the conveyor elements, and actuating means simultaneously to move said guide and to engage said vertically movable means with a presented blank.

28. In the manufacture of paper boxes from prepared blanks, blank-advancing and glue-conditioning mechanism comprising side frames, a horizontal shaft journaled on the side frames, a plurality of sets of radial spoke-like blank receivers each having automatic blank holding means, and drive gearing to turn the shaft step by step to move said receivers in succession from blank receiving to blank presenting positions and return.

29. In a box-making machine, a main frame, forming mechanism thereon for operating on blanks presented edgewise to it, advancing means so to present the blanks, stop means to limit the advancing movement, one or more justifying fingers pivotally hung on the frame and adapted to swing in behind each blank as it is advanced to the forming mechanism, and operating connections for swinging said finger or fingers so as to follow immediately behind the trailing edge of each blank to justify it by correcting for any rebound or other irregular positioning.

30. Box-making mechanism according to claim 29 in which the operating connections include means for variably interconnecting them to alter the throw of the justifying finger or fingers for different sizes of blanks, and the limiting stop means are likewise adjustable for a similar purposes.

31. In a box-making machine, spaced side frames, cross rods on the frames, oppositely disposed front and rear throat-forming members on said rods, each including a blank-engaging plate, a collar adjustably positionable along the corresponding cross rod, and a bracket carrying the plate and adjustably supported by the collar for variably positioning the plate relative to the throat in the direction perpendicular to the cross rod.

32. In a box-making machine, spaced side frames, cross rods on the frames, oppositely disposed front and rear throat-forming members on said rods, spaced side presser plates extending between the cross rods and oppositely disposed to form a quadrilateral throat with said front and rear members, bearing sleeves supporting the presser plates for in and out reciprocating movement on the cross rods, toggle levers for so moving each presser plate, and cam and link connections for operating the toggle levers, said connections including a compressible link and adjustable spring means tending normally to extend the link.

33. In a machine for setting up blanks to form turned-in-end boxes, a forming throat including opposed front and rear members and reciprocable presser plates engageable with the box end walls, each presser plate having a plurality of inwardly facing tucker fingers distributed along its upper portion, a rock shaft rotatably supported by the plate and having said fingers fixed on it, and means to rock said shaft irrespective of movement of the plate to turn said fingers inwardly and the reverse.

34. In a machine for setting up blanks to form turned-in-end boxes, a forming throat including opposed front and rear members and reciprocable presser plates engageable with the box end walls, plunger mechanism movable into and reversely out of the throat to set up a blank presented across it, tucker fingers mounted on each end-wall presser plate for rocking movement at the upper portion of the plate into and out from the throat, and means actuated by the plunger mechanism for rocking said fingers to inturn and retract them in advance of entry of the plunger mechanism into the throat.

35. In a machine for setting up blanks to form turned-in-end boxes, a forming throat including opposed front and rear members and reciprocable presser plates engageable with the box end walls, plunger mechanism movable into and reversely out of the throat to set up a blank presented across it, tucker fingers along the upper portion of each end-wall presser plate, a rock shaft carried by the presser plate and having said fingers fixed on it, rack and pinion means for rocking said shaft, cam means associated with the plunger mechanism, and operating connections between said cam means and the rack and pinion means for rocking said fingers to inturn and retract them in timed relation with the plunger mechanism.

36. In a box-making machine, spaced side frames, cross rods on the frames, oppositely disposed front and rear throat-forming members on said rods, at least one of said members having at its inner face a slot formation extending in the direction through the throat, an ejector hook movable along said slot formation and adapted to project over the free edge of the adjacent set-up box wall, means supporting the hook for outward yielding movement to admit the blank, and means to move the hook toward the bottom wall of the box to eject the latter bottom foremost.

37. In a box-making machine, spaced side frames, cross rods on the frames, oppositely disposed front and rear throat-forming members on said rods, spaced side presser plates extending between the cross rods and oppositely disposed to form a quadrilateral throat with said front and rear members, said presser plates being movably supported on the cross rods, an inward projection at the lower portion of each presser plate for underlying and supporting the box during the setting-up operation, and actuating means for the presser plates affording them an initial limited inward movement to position said projections and a subsequent further inward pressure-applying movement.

38. In machinery for setting up prepared blanks to form boxes, blank selecting and advancing mechanism to forward the blanks individually in regular series and with a given face uppermost, gluing mechanism operable to apply glue to the then under faces of the blanks, blank forming mechanism spaced from said first mechanism in the direction of travel of the blanks, means operatively interposed between the gluing and the forming mechanisms for forwarding the blanks from one to the other thereof and simultaneously inverting the blanks and tempering the glue applied to them, said means including a wheel intermittently rotatable about a horizontal axis and operable to receive and to deliver the individual blanks radially of said axis, and coordinated driving mechanism for actuating said mechanisms and said forwarding means.

HORACE W. GREGOIRE.